(12) United States Patent
Diamant et al.

(10) Patent No.: US 12,645,605 B1
(45) Date of Patent: Jun. 2, 2026

(54) DMA COALESCING

(71) Applicant: Amazon Technologies, Inc., Seattle, WA (US)

(72) Inventors: Ron Diamant, San Jose, CA (US); Yunxuan Yu, Sunnyvale, CA (US); Taylor Goodhart, Snohomish, WA (US); Robert Geva, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1139 days.

(21) Appl. No.: 17/449,499

(22) Filed: Sep. 30, 2021

(51) Int. Cl.
| | |
|---|---|
| *G06F 12/1081* | (2016.01) |
| *G06F 9/30* | (2018.01) |
| *G06F 13/16* | (2006.01) |
| *G06N 3/04* | (2023.01) |
| *G06N 3/0464* | (2023.01) |

(52) U.S. Cl.
CPC ...... *G06F 12/1081* (2013.01); *G06F 9/30043* (2013.01); *G06F 13/1668* (2013.01); *G06N 3/04* (2013.01); *G06N 3/0464* (2023.01)

(58) Field of Classification Search
None
See application file for complete search history.

(56) References Cited

U.S. PATENT DOCUMENTS

| | | | | | |
|---|---|---|---|---|---|
| 7,334,056 | B2 * | 2/2008 | Ellis | ........................ | G06F 13/28 |
| | | | | | 710/52 |
| 7,437,529 | B2 * | 10/2008 | Burugula | ............ | G06F 12/1009 |
| | | | | | 711/170 |
| 10,366,026 | B1 * | 7/2019 | Diamant | ............... | G06F 12/023 |
| 10,872,290 | B2 * | 12/2020 | Goulding | ............ | G06F 12/0824 |
| 11,003,606 | B2 * | 5/2021 | Birsan | ...................... | G06F 13/28 |
| 11,467,973 | B1 * | 10/2022 | Diamant | ............... | G06N 3/063 |
| 11,502,696 | B2 * | 11/2022 | Mathuriya | ............. | G06N 3/065 |
| 11,513,986 | B1 * | 11/2022 | Khan | ....................... | G06F 13/28 |
| 11,625,269 | B1 * | 4/2023 | Geva | ........................ | G06F 8/43 |
| | | | | | 712/220 |
| 11,995,013 | B2 * | 5/2024 | Lim | ........................ | G06F 13/28 |
| 12,131,188 | B1 * | 10/2024 | Geva | ........................ | G06F 8/43 |
| 2006/0288187 | A1 * | 12/2006 | Burugula | .............. | G06F 12/126 |
| | | | | | 711/171 |
| 2014/0122553 | A1 * | 5/2014 | Dehner | ................. | G06F 17/142 |
| | | | | | 708/403 |
| 2017/0011288 | A1 * | 1/2017 | Brothers | ............ | G06F 9/30036 |
| 2017/0200094 | A1 * | 7/2017 | Bruestle | ................. | G06F 7/023 |
| 2019/0087708 | A1 * | 3/2019 | Goulding | .............. | G06N 3/082 |
| 2020/0401540 | A1 * | 12/2020 | Birsan | ..................... | G06F 13/28 |

* cited by examiner

*Primary Examiner* — Maikhanh Nguyen
(74) *Attorney, Agent, or Firm* — Weaver Austin Villeneuve & Sampson LLP

(57) ABSTRACT

A computer-implemented method includes generating or receiving instruction code for executing by a computing device to implement a neural network model, where the instruction code includes a plurality of direct memory access (DMA) instructions for data transferring between a local memory of an accelerator of the computing device and a system memory of the computing device; modifying the instruction code to arrange sources or destinations of a group of DMA instructions of the plurality of DMA instructions into a contiguous block in the local memory; and replacing the group of DMA instructions with a single DMA instruction, wherein a source address or a destination address of the single DMA instruction is the contiguous block of the local memory.

17 Claims, 13 Drawing Sheets

900

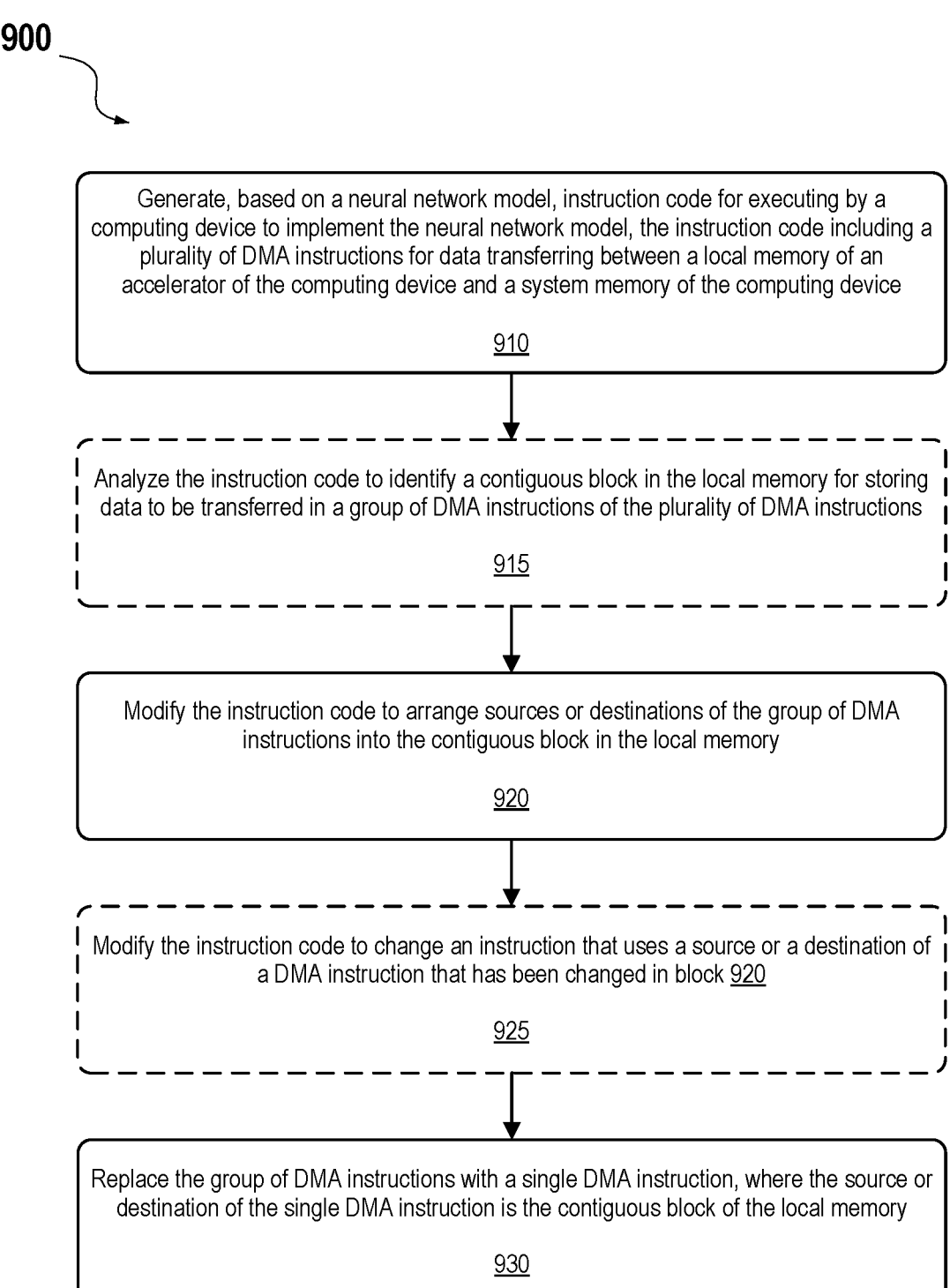

Generate, based on a neural network model, instruction code for executing by a computing device to implement the neural network model, the instruction code including a plurality of DMA instructions for data transferring between a local memory of an accelerator of the computing device and a system memory of the computing device

910

Analyze the instruction code to identify a contiguous block in the local memory for storing data to be transferred in a group of DMA instructions of the plurality of DMA instructions

915

Modify the instruction code to arrange sources or destinations of the group of DMA instructions into the contiguous block in the local memory

920

Modify the instruction code to change an instruction that uses a source or a destination of a DMA instruction that has been changed in block 920

925

Replace the group of DMA instructions with a single DMA instruction, where the source or destination of the single DMA instruction is the contiguous block of the local memory

DMA COALESCING

BACKGROUND

Artificial neural networks are computing systems with architectures based on biological neural networks. Artificial neural networks can be trained to perform certain tasks, such as natural language processing, identifying or classifying physical objects, activities, and characters, and the like. An artificial neural network may include multiple layers of processing nodes. Processing nodes on one neural network layer may perform computations on input data generated by processing nodes on the preceding layer to generate output data. In many neural network models, the size of the data used by the neural network model, including the input data, weights to be applied to the input data, and intermediate output data from preceding layers, can be too large to fit in the local memory of a processing unit, such as a graphics processing unit (GPU), a tensor processing unit (TPU), or a neural network processor. As such, the input data, weights, and/or out data may need to be transferred between the local memory and a large-capacity memory device outside of the processing unit, such as a dynamic random access memory (DRAM) device in the system memory.

BRIEF DESCRIPTION OF THE DRAWINGS

Various embodiments in accordance with the present disclosure will be described with reference to the drawings, in which:

FIG. 9 illustrates an example of a process of coalescing DMA instructions according to certain embodiments;

DETAILED DESCRIPTION

Figure 1:
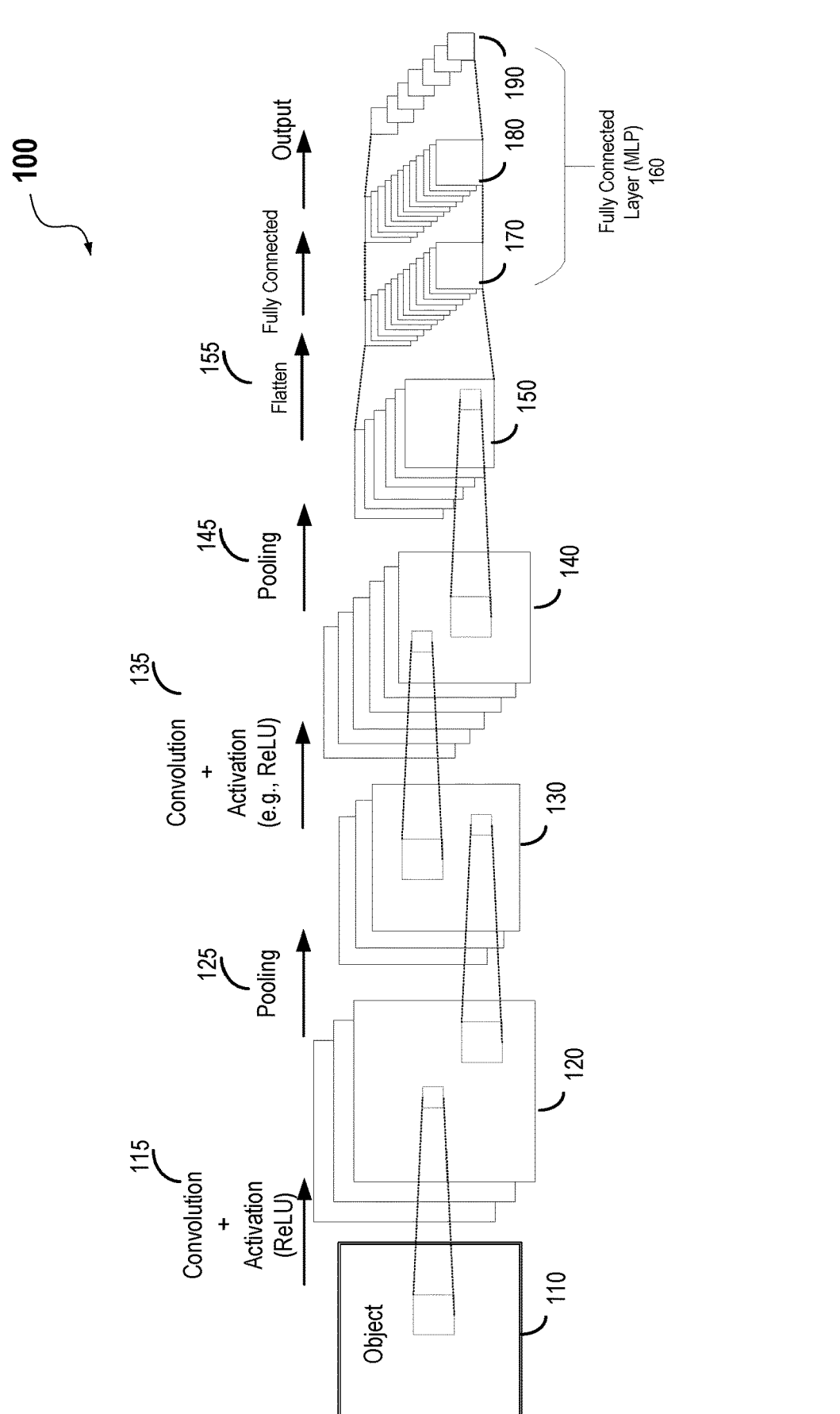
FIG. 1 illustrates an example of a convolutional neural network (CNN)

Techniques disclosed herein relate generally to artificial neural networks. More specifically, disclosed herein are techniques for coalescing a group of direct memory access (DMA) operations during compilation of a neural network model to reduce the number of DMA operations (e.g., DMA save instructions and DMA load instructions) that may have long latency and limited bandwidth, thereby improving the overall performance of a computing system for implementing the neural network model. Various inventive embodiments are described herein, including devices, systems, circuits, methods, processes, non-transitory computer-readable media, and the like.

An artificial neural network may generally include multiple processing nodes arranged on two or more layers. Processing nodes on a neural network layer may receive a stream of input data elements, multiply the input data elements with corresponding weights to compute weighted sums of the input data elements, and forward the weighted sums to the next layer. The size of the data used in each layer, such as the dimensions of input data for each channel, the number of channels, the number of weights (e.g., filters) to be applied to the input data, the dimension of each filter, and the like, can be very large. For example, a convolutional neural network may include thousands or more of processing nodes and millions or more of weights and input data elements. Some applications (e.g., natural language processing and autonomous navigation) may need almost instantaneous inference results with minimal latency and high throughput, and/or may have large feature maps and/or weight matrices for large tensor operations (e.g., matrix multiplications for convolution operations). Therefore, neural network models developed to perform complex tasks may have high demand on computational power and local memory space.

The underlying hardware for implementing a neural network, such as a computing system including a graphic processing unit (GPU), a tensor processing unit (TPU), a processing element array, or another processing engine, may generally have a certain number of processing elements (e.g., in a pre-configured two-dimensional array), and a local memory (sometimes referred to as a state buffer) having a finite size and a maximum data read/write bandwidth. For example, the local memory of a neural network processor may include a few megabytes. The neural network processor may include, for example, equal to or less than about $128 \times 128$ processing elements. Therefore, the neural network processor may not have sufficient local memory to simultaneously store the weights and feature maps used for the computation and may not have sufficient processing elements to perform large tensor operations. As such, some data (e.g., intermediate output results) in the state buffer may need to be temporarily saved to the system memory to make room for other data, and may need to be reloaded into the state buffer when the data needs to be used. This process may be referred to as spilling and reloading. Furthermore, data transfer between the local memory of the neural network processor and the system memory (e.g., a DRAM on another chip or another circuit board) may have a finite bandwidth shared by multiple devices, and thus it may take a long time to load a large tensor from the system memory to the local memory or save a large tensor from the local memory to the system memory.

As such, many neural network models may be executed by neural network processors in a piecemeal fashion in which a large tensor operation may be converted into many small tensor operations using small tensors, such as a subset of weights and/or a subset (e.g., a tile) of a feature map. Tensors used by the neural network processor (including static variables such as filters or weights) and tensors generated by the neural network processor (e.g., intermediate output results) may need to be appropriately allocated to and removed from the local memory during the execution of the neural network model, such that tensors used for a computation operation by the neural network processor may be available at the relatively small local memory with a minimum delay when needed, in order to fully utilize resources (e.g., the computing power) of the neural network processor to achieve a high performance (e.g., a high throughput and/or a short inference time). Converting a large tensor operation into many smaller tensor operations can also reduce constraints on resource allocation (e.g., local memory allocation), and reduce the latency of loading tensors used by the small tensor operations and/or the latency of saving smaller tensors (e.g., for memory spilling).

The memory allocation, tensorization (converting a large tensor operation into multiple smaller tensor operations), and data transfer may be determined by a compiler that generates and schedules instructions to be executed by the neural network processor and other execution engines of a computing system to implement a neural network model. The instructions may generally include instructions for memory load operations that load input data (e.g., input feature maps) and static variables (e.g., weight matrices or filter tensors) into the local memory, instructions for computation operations that use the input data and the static variables to perform arithmetic operations, and memory save operations that save outputs (e.g., intermediate results) of the computation operations to the system memory to make room for other input tensors used by other operations.

Data transfers between the local memory of a neural network processor and the system memory, including loading input tensors from the system memory to the local memory and saving output tensors from the local memory to the system memory, may be performed using a direct memory access (DMA) controller, in order to limit the involvement of the host processor. The DMA controller may include an interface that may have limited bandwidth (e.g., about 128 or 256 Bytes per cycle) and may be shared by multiple processing engines in the computing system. A DMA controller may use memory descriptors to perform the data transfers to or from a DRAM. Retrieving the memory descriptors, initializing the DRAM access, and regularly refreshing the DRAM may incur additional overhead for the DMA transfers. Thus, DMA accesses may have a long latency and a low bandwidth/throughput.

In many applications, the sizes of input tensors used by a neural network model and/or output tensors generated by the neural network model can be hundreds of times greater than the capacity of the local memory. Due to the long latency and/or low bandwidth of each DMA access, accessing system memory hundreds of times to transfer smaller tensors using DMA can cause prolonged latencies and hinder practical applications of the neural network model.

According to certain embodiments, to reduce the overhead of performing a large number of DMA transfers, DMA coalescing techniques may be used during the compilation of a neural network model to coalesce a group of small DMA operations (e.g., DMA save or load operations with less than about 256 B/partition) into a large DMA operation (e.g., a DMA save or load operation with about 2 KB/partition). The DMA coalescing may be performed after the resource allocation and instruction generation, and may include analyzing the local memory allocation and usage by the instructions, arranging sources or destinations of a group of DMA operations into a contiguous block in the local memory, and modifying the instructions to, for example, replace the group of DMA operations with a large DMA operation that uses the contiguous block as the source or destination, replace some DMA operations with operations that can be performed without using DMA, change the local memory addresses specified in some instructions, or any combination thereof. The contiguous block of the local memory may be a contiguous 2-dimensional block that includes adjacent elements in one or more adjacent partitions of the local memory.

In one example, a group of DMA save instructions that store data (e.g., tensors) to a same DRAM block may be coalesced by arranging the sources of the group of DMA save instructions into a same local memory block, and then save data in the local memory block into the DRAM block using a single DMA save instruction to reduce the total number of DMA save instructions. Arranging the sources of the group of DMA save instructions into a same local memory block may include modifying instructions that write intermediate outputs to the sources of the DMA save instructions, such that the instructions now write the intermediate outputs to a contiguous local memory block that would not violate other memory constraints (e.g., the contiguous local memory block is not used to store other data between the first DMA save instruction and the last DMA save instruction in the group). In some embodiments, arranging the sources of the group of DMA save instructions may also include moving other data within the local memory to a different location in the local memory to create a contiguous local memory block that can be used to hold the sources of the group of DMA save instructions without violating other memory usage constraints. The sources of different DMA save instructions in the group of DMA save instructions may be in different partitions and/or at different elements of the same partitions in the contiguous local memory block. In some embodiments, DMA save instructions that do not write to a same DRAM block may also be coalesced if the sources of these DMA save instructions have the same data type, and either have the same partition number/range or include tensors that are parts of a same large tensor. Because the group of DMA save instructions can be coalesced into a single DMA save instruction that writes data in a contiguous local memory block to a same DRAM block, DMA load instructions that reload the data saved to the DRAM block by the group of DMA save instructions may also be coalesced into one DMA load instruction that loads data from the DRAM block to a local memory block.

In another example, a group of DMA load instructions that load data from a contiguous DRAM block (e.g., data saved to the contiguous DRM block by a coalesced DMA save instruction) to the local memory may be coalesced by arranging the destinations of the group of DMA load instructions into a same local memory block, and then load data into the local memory block using a single DMA load instruction. In some embodiments, arranging the destinations of the group of DMA load instructions may include identify a local memory block that can hold the data to be loaded without violating other memory constraints (e.g., not used to store other data between the first DMA load instruction and the last DMA load instruction in the group). In some embodiments, arranging the destinations of the group of DMA load instructions may include moving other data in the local memory to a different location within the local memory to create a contiguous local memory block that can be used to hold the data to be loaded by the group of DMA load instructions. The destinations of different DMA load instructions in the group of DMA load instructions may be in different partitions and/or at different elements of the same partitions in the contiguous local memory block. In some embodiments, DMA load instructions that write to different local memory blocks (e.g., different state buffer banks as described below with respect to FIG. 3) may also be coalesced.

Techniques disclosed here perform an additional process in the neural network model compilation flow to coalesce a group of small DMA operations (e.g., save and load operations) into a single DMA operation in the final instruction code, thereby reducing the overhead that may otherwise be associated with the group of small DMA operations. In some embodiments, the DMA coalescing may be achieved by moving data within the local memory using a tensor copy operation that has a low latency, a low overhead, and a high throughput. As such, a computing system executing the instruction code generated and modified by the compiler can implement the neural network model with a lower latency, a higher speed, and a higher throughput.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Artificial neural networks (also referred to as "neural networks") have been used in machine learning research and industrial applications and have achieved many break-through results in, for example, image recognition, speech recognition, computer vision, natural language processing, and the like. An artificial neural network may include multiple processing nodes arranged on two or more layers, where processing nodes on one layer may connect to processing nodes on another layer. The processing nodes can be divided into layers including, for example, an input layer, a number of intermediate layers (also known as hidden layers), and an output layer. Each processing node on a layer (e.g., an input layer, an intermediate layer, etc.) may receive a sequential stream of input data elements, multiply each input data element with a weight, compute a weighted sum of the input data elements, and forward the weighted sum to the next layer. An artificial neural network, such as a convolutional neural network (ConvNet or CNN), may include thousands or more of processing nodes and millions or more of weights and input data elements.

A convolutional neural network may perform operations including, for example, (1) convolution; (2) non-linearity (or activation) function (e.g., ReLU); (3) pooling or sub-sampling; and (4) classification. Different CNNs may have different combinations of these four main operations, as well as other additional operations. For example, a ResNet-50 network may include network layers that include mostly convolution layers and a few pooling layers, and may also perform residue-add operations for residue learning.

FIG. 1 illustrates an example of a convolutional neural network (CNN) 100 for image or other object classifications. CNN 100 may perform four types of operations including convolution, non-linearity (or activation) function (e.g., ReLU), pooling or sub-sampling, and classification (fully-connected layer). An object 110 to be classified, such as one or more input images or other input datasets (referred to as input feature maps), may be represented by a matrix of pixel values. For example, object 110 may include multiple channels (e.g., multiple input feature maps), each channel representing a certain component of object 110. For example, an image from a digital camera may have at least a red channel, a green channel, and a blue channel, where each channel may be represented by a 2-D matrix of pixels having pixel values in the range of, for example, 0 to 255 (i.e., 8-bit). A gray-scale image may have only one channel. In the following description, the processing of a single image channel using CNN 100 is described. Other channels may be processed similarly.

As shown in FIG. 1, object 110 (e.g., input images) may first be processed by a first convolution layer 115 using a first set of filters, where first convolution layer 115 may perform a convolution between a matrix representing the input image and a matrix representing each filter in the first set of filters. The convolution may include multiple matrix multiplication. First convolution layer 115 may also perform a non-linear activation function (e.g., ReLU). An output matrix 120 from first convolution layer 115 may have smaller dimensions than the input image. First convolution layer 115 may perform convolutions on the input image using the first set of filters to generate multiple output matrices 120, which may be referred to as output feature maps of first convolution layer 115. The number of filters used may be referred to as the depth of the convolution layer. In the example shown in FIG. 1, first convolution layer 115 may have a depth of three. Each output matrix 120 (e.g., an output feature map) may be passed to a pooling layer 125, where each output matrix 120 may be subsampled or down-sampled to generate a matrix 130.

Each matrix 130 may be processed by a second convolution layer 135 using a second set of filters. A non-linear activation function (e.g., ReLU) may also be performed by the second convolution layer 135 as described above. An output matrix 140 (e.g., an output feature map) from second convolution layer 135 may have smaller dimensions than matrix 130. Second convolution layer 135 may perform convolutions on matrix 130 using the second set of filters to generate multiple output matrices 140. In the example shown in FIG. 1, second convolution layer 135 may have a depth of six. Each output matrix 140 may be passed to a pooling layer 145, where each output matrix 140 may be subsampled or down-sampled to generate an output matrix 150.

The output matrices 150 from pooling layer 145 may be flattened to vectors by a flatten layer 155, and passed through a fully-connected layer 160 (e.g., a multi-layer perceptron (MHLP)). Fully-connected layer 160 may include an input layer 170 that takes the 1-D output vector from flatten layer 155. Fully-connected layer 160 may also include a hidden layer and an output layer 190. Fully-connected layer 160 may classify the object in the input image into one of several categories using feature maps or output matrix 150 and, for example, a Softmax function. The operation of the fully-connected layer may be represented by matrix multiplications. For example, if there are M nodes on input layer 170 and N nodes on hidden layer 180, and the weights of the connections between the M nodes on input layer 170 and the N nodes on hidden layer 180 can be represented by a matrix W that includes M×N elements, the output Y of hidden layer 180 may be determined by $Y = X \times W$.

The convolution operations in a CNN may be used to extract features from the input image. The convolution operations may preserve the spatial relationship between pixels by extracting image features using small regions of the input image. In a convolution, a matrix (referred to as a filter, a kernel, or a feature detector) may slide over the input image (or a feature map) at a certain step size (referred to as the stride). For every position (or step), element-wise multiplications between the filter matrix and the overlapped matrix in the input image may be calculated and summed to generate a final value that represents a single element of an output matrix (e.g., a feature map). A filter may act to detect certain features from the original input image.

The convolution using one filter (or one filter set) over an input pixel array may be used to produce one feature map, and the convolution using another filter (or another filter set) over the same input pixel array may generate a different feature map. In practice, a CNN may learn the weights of the filters on its own during the training process based on some user specified parameters (which may be referred to as hyperparameters), such as the number of filters, the filter size, the architecture of the network, etc. The higher number of filters used, the more image features may get extracted, and the better the network may be at recognizing patterns in new images.

The sizes of the output feature maps may be determined based on parameters, such as the depth, stride, and zero-padding. As described above, the depth may correspond to the number of filters (or sets of filters) used for the convolution operation. For example, in CNN 100 shown in FIG. 1, three distinct filters are used in first convolution layer 115 to perform convolution operations on the input image, thus producing three different output matrices 120 (or feature maps). Stride is the number of pixels by which the filter matrix is slid over the input pixel array. For example, when the stride is one, the filter matrix is moved by one pixel at a time. When the stride is two, the filter matrix is moved by two pixels at a time. Having a larger stride may produce smaller feature maps. In some implementations, the input matrix may be padded with zeros around the border so that the filter matrix may be applied to bordering elements of the input pixel array. Zero-padding may allow control of the size of the feature maps.

As shown in FIG. 1, an additional non-linear operation using an activation function (e.g., ReLU) may be used after every convolution operation. ReLU is an element-wise operation that replaces all negative pixel values in the feature map by zero. The purpose of the ReLU operation is to introduce non-linearity in the CNN. Other non-linear functions described above, such as tanh or sigmoid function, can also be used, but ReLU has been found to perform better in many situations.

Spatial pooling (also referred to as subsampling or down-sampling) may reduce the dimensions of each feature map, while retaining the most important information. In particular, pooling may make the feature dimensions smaller and more manageable, and reduce the number of parameters and computations in the network. Spatial pooling may be performed in different ways, such as max pooling, average pooling, sum pooling, etc. In max pooling, the largest element in each spatial neighborhood (e.g., a 2×2 window) may be used to represent the spatial neighborhood. Instead of taking the largest element, the average (for average pooling) or sum (for sum pooling) of all elements in each window may be used to represent the spatial neighborhood. In many applications, max pooling may work better than other pooling techniques.

In the example shown in FIG. 1, two sets of convolution and pooling layers are used. It is noted that these operations can be repeated any number of times in a single CNN. In addition, a pooling layer may not be used after every convolution layer. For example, in some implementations, a CNN may perform multiple convolution and ReLU operations before performing a pooling operation.

The training process of a convolutional neural network, such as CNN 100, may be similar to the training process for any feedforward neural network. First, all parameters and weights (including the weights in the filters and weights for the fully-connected layer) may be initialized with random values (or the parameters of a known neural network). Second, the convolutional neural network may take a training sample (e.g., a training image) as input, perform the forward propagation steps (including convolution, non-linear activation, and pooling operations, along with the forward propagation operations in the fully-connected layer), and determine the output probability for each possible class. Since the parameters of the convolutional neural network, such as the weights, are randomly assigned for the training example, the output probabilities may also be random.

At the end of the training process, all weights and parameters of the CNN may have been optimized to correctly classify the training samples from the training dataset. When an unseen sample (e.g., a test sample or a new sample) is input into the CNN, the CNN may go through the forward propagation step and output a probability for each class using the trained weights and parameters, which may be referred to as an inference (or prediction) process as compared to the training process. If the training dataset is sufficient, the trained network may classify the unseen sample into a correct class.

Figure 2:
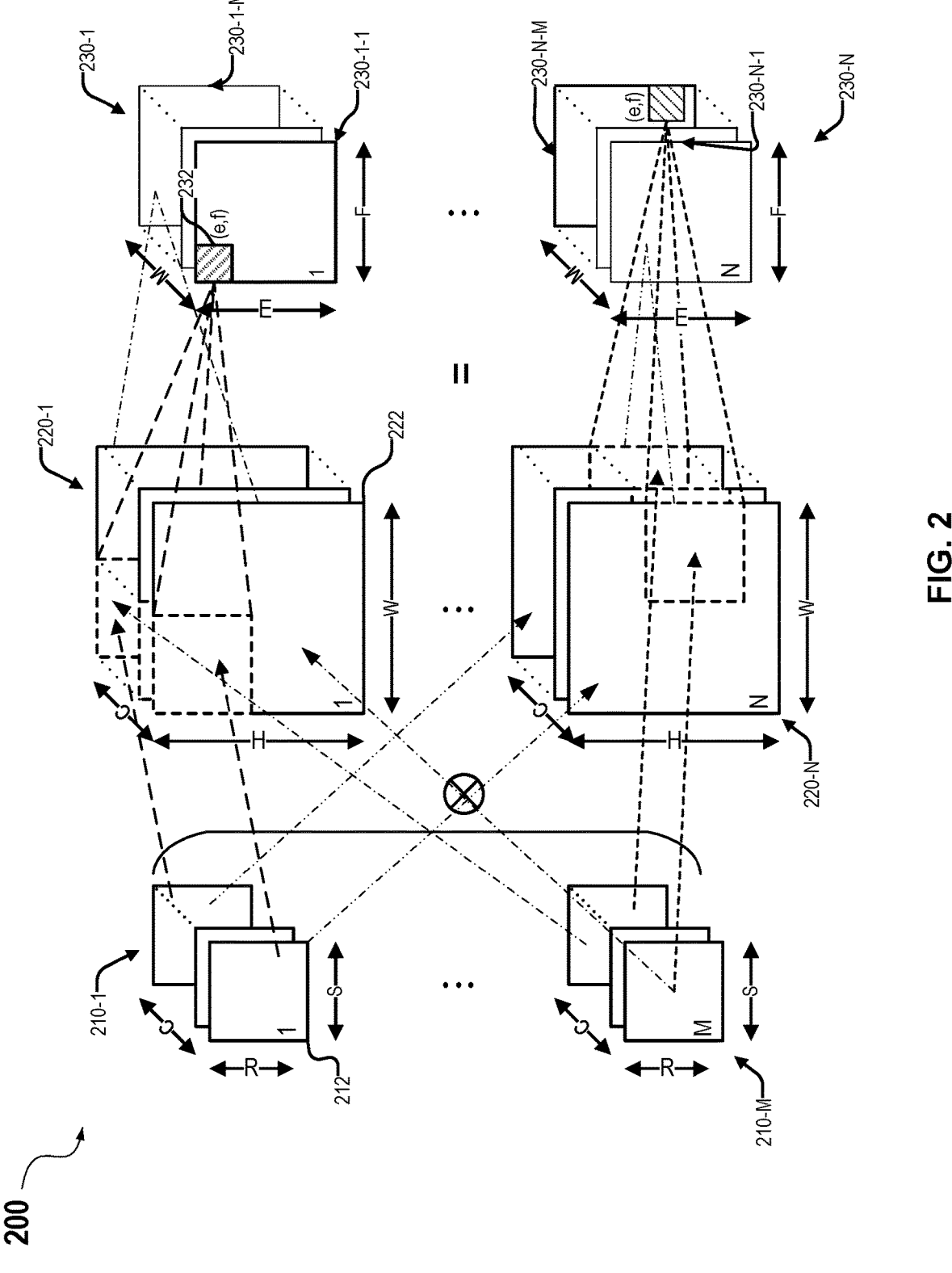
FIG. 2 illustrates an example of a model for a convolution layer of a convolutional neural network.

FIG. 2 illustrates an example of a model 200 for a convolution layer of a convolutional neural network used in, for example, image processing. As illustrated in the example, there may be multiple (e.g., N) 3-D inputs 220-1, . . . , and 220-N to the convolution layer. Each 3-D input may include C channels of 2-D input feature maps (with dimensions H×W). For the first convolution layer in a CNN, such as a ResNet-50, a 3-D input may include, for example, three channels of 2-D images, such as the red, green, and blue color channels. Multiple (e.g., M) 3-D filters 210-1, . . . , and 210-M, each having C 2-D filters of dimensions R×S, may be convolved with the N 3-D inputs 220-1, . . . , and 220-N (e.g., N batches of C input feature maps of dimensions H×W) to generate multiple (e.g., N) 3-D outputs 230-1, . . . , and 230-N, where each of the 3-D outputs 230-1, . . . , and 230-N may include M output feature maps (also referred to as output channels). Each 3-D filter 210-1, . . . , or 210-M (with dimensions C×R×S) may be applied to a 3-D input 220-1, . . . , or 220-N (with dimensions C×H×W) to generate an output feature map (with dimensions E×F as described above with respect to FIGS. 3A and 3B) in a 3-D output 230-1, . . . , or 230-N that includes M output feature maps, and thus M 3-D filters may be used to generate the M output feature maps in a 3-D output 230-1, . . . , or 230-N for a 3-D input 220-1, . . . , or 220-N. For example, 3-D filter 210-1 may be applied to 3-D input 220-1 to generate an output feature map 230-1-1, . . . and 3-D filter 210-M may be applied to 3-D input 220-1 to generate an output feature map 230-1-M. The same M 3-D filters 210-1, . . . , and 210-M can be applied to each 3-D input 220-1, . . . , or 220-N to generate each respective 3-D output 230-1, . . . , or 230-N that includes M output feature maps. For example, 3-D filter 210-1 may be applied to 3-D input 220-N to generate an output feature map 230-N-1, and 3-D filter 210-M may be applied to 3-D input 220-N to generate an output feature map 230-N-M. Thus, there are N 3-D inputs and N 3-D outputs, where each 3-D output includes M output feature maps.

More specifically, as shown in FIG. 2, for a 3-D input 220-1, . . . , or 220-N and a 3-D filter 210-1, . . . , or 210-M, the C 2-D filters (each with dimensions R×S) in a 3-D filter 210-*m* may correspond to the C channels of 2-D input feature maps (each with dimensions H×W) in the 3-D input, and the convolution operation between each 2-D filter of the C 2-D filters and the corresponding channel of the C channels of 2-D input feature maps may be performed. The convolution results for C pairs of 2-D filter and corresponding 2-D input feature map can be summed to generate a convolution output (e.g., a pixel) $O_{e,f}^{m}$ on an output feature map of index m in the M output feature maps in a 3-D output 230-1, . . . , or 230-N as follows:

$$O_{e,f}^{m} = \sum_{r=0}^{R-1}\sum_{s=0}^{S-1}\sum_{c=0}^{C-1} X_{eD+r,fD+s}^{c} \times W_{r,s}^{c,m}, \tag{1}$$

where m corresponds to the index of the output feature map and the index of the 3-D filter in the M 3-D filters. $X_{eD+r,fD+s}^{c}$ is the value of a pixel with a horizontal pixel coordinate of eD+r and a vertical pixel coordinate of fD+s in an input feature map of index C in the C channels of 2-D input feature maps in a 3-D input. D is the sliding-window stride distance. e and f are the coordinates of the output pixel in the corresponding output feature map of the M output feature maps and may correspond to a particular sliding window. r and s correspond to a particular location (e.g., pixel or element) within a sliding window or a 2-D filter. $W_{r,s}^{c,m}$ is a weight corresponding to a pixel at a location (r, s) of a 2-D filter of index C in the 3-D filter of index m. Equation (1) indicates that, to compute each convolution output (e.g., pixel) $O_{e,f}^{m}$ at a location (e, f) on an output feature map m, each pixel $X_{eD+r,fD+s}^{c}$ within a sliding window in an input feature map of index C may be multiplied with a corresponding weight $W_{r,s}^{c,m}$ to generate a product, the partial sum of the products for the pixels within each sliding window in the input feature map of index C can be computed, and then a sum of the partial sums for all C input feature maps can be computed to determine the value of the pixel $O_{e,f}^{m}$ at a location (e,f) in the corresponding output feature map of index m in the M output feature maps.

In one example, for 3-D filter 210-1 and 3-D input 220-1, each 2-D filter 212 in the C 2-D filters in 3-D filter 210-1 may correspond to a respective input feature map 222 in 3-D input 220-1 and may be used to convolve with (e.g., filter) the corresponding input feature map 222, where each pixel in a sliding window 224 in input feature map 222 may be multiplied with a corresponding pixel in 2-D filter 212 to generate a product, and the products for all pixels in sliding window 224 may be summed to generate a partial sum. The partial sums for the C 2-D filters 212 (and corresponding input feature map 222) may be added together to generate an output pixel 232 at a location (e, f) on output feature map 230-1-1 in 3-D output 230-1. Sliding window 224 may be shifted on all C input feature maps 222 in 3-D input 220-1 based on the strides D in the two dimensions to generate another output pixel 232 at a different location on output feature map 230-1-1 in 3-D output 230-1. Sliding window 224 may be repeatedly shifted together on all C input feature maps 222 until all output pixels 232 on output feature map 230-1-1 in 3-D output 230-1 are generated.

Each 3-D filter 210-2, . . . , or 210-M may be used to convolve with 3-D input 220-1 as described above with respect to 3-D filter 210-1 to generate each respective output feature map 230-1-2, . . . , or 230-1-M in 3-D output 230-1. Similarly, each 3-D filter 210-1, . . . , or 210-M may be used to convolve with 3-D input 220-N as described above with respect to 3-D filter 210-1 and 3-D input 220-1 to generate each respective output feature map 230-N-1, . . . , or 230-N-M in 3-D output 230-N.

Operation of a neural network (e.g., conducting inference), as illustrated by the examples discussed above, generally involves fetching input data (or input activations) and filter data (e.g., weights), executing multiply-and-accumulate (MAC) operations on the input data and the filter data in parallel for each node in a layer, and providing output activations. Optimum performance of a neural network, for example, measured by response time, can be achieved when a hardware architecture is capable of highly parallelized computations. Special-purpose or domain-specific neural network processors can achieve better performance than both CPUs and GPUs when executing a neural network. Neural network processors can employ a spatial architecture including a processing element (PE) array, in which the processing elements may form processing chains and can pass data directly from one processing element to another. This can significantly reduce the number of memory transactions. In some examples, the weights or inputs can be pre-loaded into the processing element array. In some examples, neural network processors can also include an on-chip buffer (referred to as a local memory or a state buffer) that can store values read from external memory (e.g., a DRAM), and that can distribute values to multiple computing engines in the processor. The computing engines can further include a small, local register file (e.g., a small memory) for storing intermediate results. Having an on-chip memory hierarchy can improve the efficiency of the operation of a neural network by reducing memory latencies.

Figure 3:
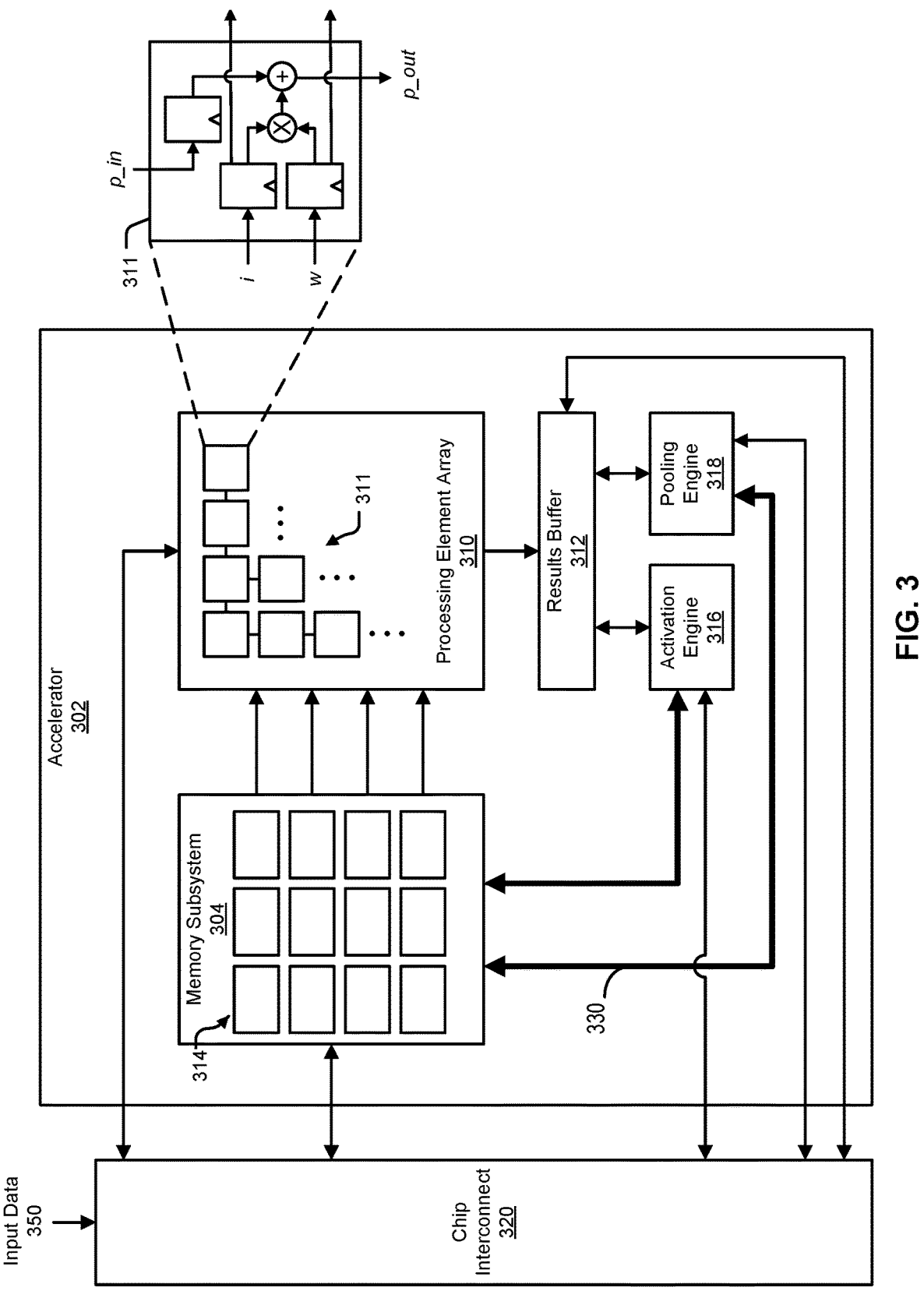
FIG. 3 is a simplified block diagram illustrating an example of an integrated circuit device for performing neural network operations according to certain embodiments.

FIG. 3 is a block diagram illustrating an example of an integrated circuit device for performing neural network operations, such as tensor operations, according to certain embodiments. The example shown in FIG. 3 includes an accelerator 302. In various examples, accelerator 302 can execute computations for a set of input data (e.g., input data 350) using a processing element array 310, an activation engine 316, and/or a pooling engine 318. In some examples, accelerator 302 may be an integrated circuit component of a processor, such as a neural network processor. The processor may have other integrated circuit components, including additional accelerator engines.

In some embodiments, accelerator 302 may include a memory subsystem 304 (e.g., a state buffer) that includes multiple memory banks 314. Each memory bank 314 can be independently accessible, such that the read of one memory bank is not dependent on the read of another memory bank. Similarly, writing to one memory bank may not affect or limit writing to a different memory bank. In some cases, each memory bank can be read and written at the same time. Various techniques can be used to have independently accessible memory banks 314. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 304 can permit simultaneous access to the read or write channels of multiple memory banks. As another example, the memory subsystem 304 can include arbitration logic such that arbitration between, for example, the outputs of multiple memory banks 314 can result in more than one memory bank's output being used. In these and other examples, though globally managed by the memory subsystem 304, each memory bank can be operated independently of any other.

Having the memory banks 314 independently accessible can increase the efficiency of accelerator 302. For example, values can be simultaneously read and provided to each row of processing element array 310, so that the entire processing element array 310 can be in use in one clock cycle. As another example, memory banks 314 can be read at the same time that results computed by processing element array 310 are written to memory subsystem 304. In contrast, a single memory may be able to service only one read or write at a time. With a single memory, multiple clock cycles can be required, for example, to read input data for each row of processing element array 310 before processing element array 310 can be started.

In various implementations, memory subsystem 304 can be configured to simultaneously service multiple clients, including processing element array 310, activation engine 316, pooling engine 318, and any external clients that access memory subsystem 304 over a communication fabric 320. In some implementations, being able to service multiple clients can mean that memory subsystem 304 has at least as many memory banks as there are clients. In some cases, each row of processing element array 310 can count as a separate client. In some cases, each column of processing element array 310 can output a result, such that each column can count as a separate write client. In some cases, output from processing element array 310 can be written into memory banks 314 that can then subsequently provide input data for processing element array 310. As another example, activation engine 316 and pooling engine 318 can include multiple execution channels, each of which can be separate memory clients. Memory banks 314 can be implemented, for example, using static random access memory (SRAM).

In various implementations, memory subsystem 304 can include control logic. The control logic can, for example, keep track of the address spaces of each of memory banks 314, identify memory banks 314 to read from or write to, and/or move data between memory banks 314. In some implementations, memory banks 314 can be hardwired to particular clients. For example, a set of memory banks 314 can be hardwired to provide values to the rows of processing element array 310, with one memory bank servicing each row. As another example, a set of memory banks can be hard wired to receive values from columns of processing element array 310, with one memory bank receiving data for each column.

Processing element array 310 is the computation matrix of accelerator 302. Processing element array 310 can, for example, execute parallel integration, convolution, correlation, and/or matrix multiplication, among other things. Processing element array 310 may include multiple processing elements 311, arranged in rows and columns, such that results output by one processing element 311 can be input directly into another processing element 311. Processing elements 311 that are not on the outside edges of processing element array 310 thus can receive data to operate on from other processing elements 311, rather than from memory subsystem 304.

In various examples, processing element array 310 uses systolic execution, in which data arrives at each processing element 311 from different directions at regular intervals. In some examples, input data can flow into processing element array 310 from the left and weight values can be loaded at the top. In some examples weights and input data can flow from the left and partial sums can flow from top to bottom. In these and other examples, a multiply-and-accumulate operation moves through processing element array 310 as a diagonal wave front, with data moving to the right and down across the array. Control signals can be input at the left at the same time as weights, and can flow across and down along with the computation.

In various implementations, the numbers of columns and rows in processing element array 310 may determine the computational capacity of processing element array 310. For example, the number of rows in processing element array 310 may determine the number of input feature maps that can be processed in parallel, and the number of columns in processing element array 310 may determine the number of filter sets that can be applied in parallel to input data. The number of rows in processing element array 310 may also determine the memory bandwidth for achieving the maximum utilization of processing element array 310. Processing element array 310 can have, for example, 64 columns and 128 rows, or some other number of columns and rows.

An example of a processing element 311 is illustrated in an inset diagram in FIG. 3. As illustrated by this example, processing element 311 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing element 311.

In the illustrated example, an input from above can include a partial sum, p_in, provided either from another processing element 311 or from a previous round of computation by processing element array 310. When starting a computation for a new set of input data, the top row of processing element array 310 can receive a fixed value for p_in, such as zero. As illustrated by this example, i and w are multiplied together and the result is summed with p_in to produce a new partial sum, p_out, which can be input into another processing element 311. Various other implementations of processing element 311 are possible.

Outputs from the last row in processing element array 310 can be temporarily stored in a results buffer 312 (e.g., partial sum (PSUM) buffer). The results can be intermediate results, which can be written to memory banks 314 to be provided to processing element array 310 for additional computation. Alternatively, the results can be final results, which, once written to memory banks 314 can be read from memory subsystem 304 over communication fabric 320, to be output by the system.

In some implementations, accelerator 302 includes an activation engine 316. In these implementations, activation engine 316 can combine the results from processing element array 310 into one or more output activations. For example, for a convolutional neural network, convolutions from multiple channels can be summed to produce an output activation for a single channel. In other examples, accumulating results from one or more columns in processing element array 310 may be needed to produce an output activation for a single node in the neural network. In some examples, activation engine 316 can be bypassed.

In various examples, activation engine 316 can include multiple separate execution channels. In these examples, the execution channels can correspond to the columns of processing element array 310, and can perform an operation on the outputs of a column, the result of which can be stored in memory subsystem 304. In these examples, activation engine 316 may be able to perform between 1 and N parallel computations, where Nis equal to the number of columns in processing element array 310. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, accelerator 302 can include a pooling engine 318. Pooling is the combining of outputs of the columns of processing element array 310. Combining can include for example, computing a maximum value, a minimum value, an average value, a median value, a summation, a multiplication, or another logical or mathematical combination. In various examples, pooling engine 318 can include multiple execution channels that can operating on values from corresponding columns of processing element array 310. In these examples, pooling engine 318 may be able to perform between 1 and N parallel computations, where Nis equal to the number of columns in processing element array 310. In various examples, execution channels of pooling engine 318 can operate in parallel and/or simultaneously. In some examples, pooling engine 318 can be bypassed.

Herein, activation engine 316 and pooling engine 318 may be referred to collectively as execution engines. Processing element array 310 is another example of an execution engine. Another example of an execution engine is a Direct Memory Access (DMA) engine, which may be located outside accelerator 302 and may transfer data between accelerator 302 and an external storage device, such as a DRAM device.

Input data 350 can arrive over communication fabric 320. Communication fabric 320 can connect accelerator 302 to other components of a processor, such as a DMA engine that can obtain input data 350 from an Input/Output (I/O) device, a storage drive, or a network interface. Input data 350 can be, for example one-dimensional data, such as a character string or numerical sequence, or two-dimensional data, such as an array of pixel values for an image or frequency and amplitude values over time for an audio signal. In some examples, input data 350 can be three-dimensional, as may be the case with, for example, the situational information used by a self-driving car or virtual reality data. In some implementations, memory subsystem 304 can include a separate buffer for input data 350. In some implementations, input data 350 can be stored in memory banks 314 when accelerator 302 receives input data 350.

In some examples, accelerator 302 can implement a neural network processing engine. In these examples, accelerator 302, for a set of input data 350, can execute a neural network to perform a task for which the neural network was trained. Executing a neural network on a set of input data can be referred to as inference or performing inference.

The weights for the neural network can be stored in memory subsystem 304, along with input data 350 on which the neural network will operate. The neural network can also include instructions, which can program processing element array 310 to perform various computations on the weights and the input data. The instructions can also be stored in memory subsystem 304, in memory banks 314, or in a separate instruction buffer. Processing element array 310 can output intermediate results, which represent the outputs of individual layers of the neural network. In some cases, activation engine 316 and/or pooling engine 318 may be enabled for computations called for by certain layers of the neural network. Accelerator 302 can store the intermediate results in memory subsystem 304 for inputting into processing element array 310 to compute results for the next layer of the neural network. Processing element array 310 can further output final results from a last layer of the neural network. The final results can be stored in memory subsystem 304 and then be copied out to host processor memory or to another location.

In some embodiments, mapping the tensor operation described above with respect to FIG. 2 and Equation (1) to a PE array (e.g., PE array 310) for execution may include mapping each of the M 3-D filters to a respective column of the PE array, and mapping each input feature map of the C input feature maps (e.g., C channels) in a 3-D input to a respective row of the PE array. For example, the H×W pixels in each 2-D input feature map may be flattened to form a one-dimensional vector and mapped to a row of the PE array. The C×R×S weights or pixels in each 3-D filter may be flattened to form a one-dimensional vector and mapped to a column of the PE array. Partial sums may be accumulated vertically in each column. In cases where a batch including N3-D inputs each including C channels are processed, each row of the PE array may be mapped to N 2-D input feature maps.

The movement of data, such as input pixels, filter weights, and partial sums to be accumulated, between PEs can reduce the access to the local memory or off-chip memory. In some embodiments, the input feature map can be stationary and the weights of the filters can be shifted, which may be referred to as an "image-stationary" model. In some embodiments, a "weight-stationary" model may be used, where the weights of the filters are stationary (preloaded from a local memory into the registers in the PE array) and the image is moving (loaded from the local memory during computation), in order to minimize the cost of the movement of the weights. In some embodiments, the output of a PE may be stored in the register at the PE and remains stationary to minimize the cost of the movement of the partial sums, where the input feature maps and weights may move through the PE array and the local memory.

In many neural network models, the size of the data used in each layer, including the input data, the weights (or filters), and the output data, can be very large. For example, a convolutional neural network may include thousands or more of processing nodes and millions or more of weights and input data elements. Neural network models developed to perform complex tasks may have high demand on computational power and local memory space. For example, some applications may need almost instantaneous inference results with minimal latency and high throughput, and some applications may use large feature maps and/or weight matrices. The underlying hardware for implementing a neural network, such as a computing system including a GPU, a TPU, a processing element array, or another processing engine, may generally have a certain number of processing elements (e.g., equal to or less than about 128×128 processing elements) pre-configured in columns and/or rows), and a local memory (sometimes referred to as a state buffer) having a finite size (e.g., a few megabytes) and a maximum data read/write bandwidth. Therefore, the neural network processor may not have sufficient local memory to simultaneously store the weights and feature maps used for the computation and may not have sufficient processing elements to perform large tensor operations. In addition, intermediate results may be saved to the local memory for use by subsequent operations. Furthermore, data transfer between the local memory of the neural network processor and the system memory (e.g., a DRAM on another chip or circuit board) may have a finite bandwidth, and thus it may take time to load a large tensor from the system memory to the local memory or save a large tensor from the local memory to the system memory.

As such, many neural network models may be executed by processing units in a piecemeal fashion in which a large tensor operation may be divided into many small tensor operations using small tensors, such as a subset of weights and/or a subset (e.g., a tile) of a feature map. Tensors used by the neural network processor (including static variables such as filters) and tensors generated by the neural network processor (e.g., intermediate results) may need to be appropriately allocated to and removed from the local memory during the execution of the neural network model, such that tensors used for a computation operation by the neural network processor may be available at the relatively small local memory with a minimum latency, in order to fully utilize resources (e.g., the computing power) of the neural network processor to achieve a high performance (e.g., high throughput or short processing time). Dividing a large tensor operation into many smaller tensor operations can reduce the constraint on resource allocation (e.g., local memory allocation), and can also reduce the latency of loading tensors used for the small tensor operation and/or the latency of saving smaller tensors (e.g., for memory spilling).

The memory allocation, tensorization (transforming a large tensor operation to multiple smaller tensor operations), and data transfer may be determined by a compiler that generates and schedules instructions to be executed by the neural network processor and other execution engines of a computing system to implement a neural network model. The instructions may generally include instructions for memory load operations that read input data (e.g., input feature maps) and static variables (e.g., weights, such as filter tensors for a convolutional neural network), instructions for computation operations that use the input data and the static variables to perform arithmetic operations, and memory save operations that save outputs (e.g., intermediate results) of the computation operations to the system memory to make room for other input tensors for other operations.

Accelerator 302 may perform instructions generated by a compiler using a neural network model, such as a ResNet-50 model. The neural network model may be represented by a data flow graph (or a computation graph) where each node (e.g., vertex) in the graph may represent an operation, and connections (e.g., edges) between the nodes may represent the data flow or data dependency. The compiler may traverse the data flow graph and perform shape inference on the neural network model, for example, to determine the sizes of the data used for each operation. The compiler may add, to the neural network model, operations for padding the input feature map for each input channel, based on parameters of a convolution operation, such as the size of an original input feature map, the size of a filter (e.g., kernel), the stride used for the convolution, the memory alignment, and the size of the processing element array. Optionally, the compiler may add to the neural network model operations for dividing input data into multiple partitions and dividing the convolution operation into multiple sub-operations. The compiler may map the operations of the neural network model to the computing system, such as memory subsystem 304 and processing element array 310 in accelerator 302, pooling engines 318, activation engines 316, DMA engines (not shown in FIG. 3), and the like, and generate and schedule instructions to be performed by these different components of the computing system.

Figure 4:
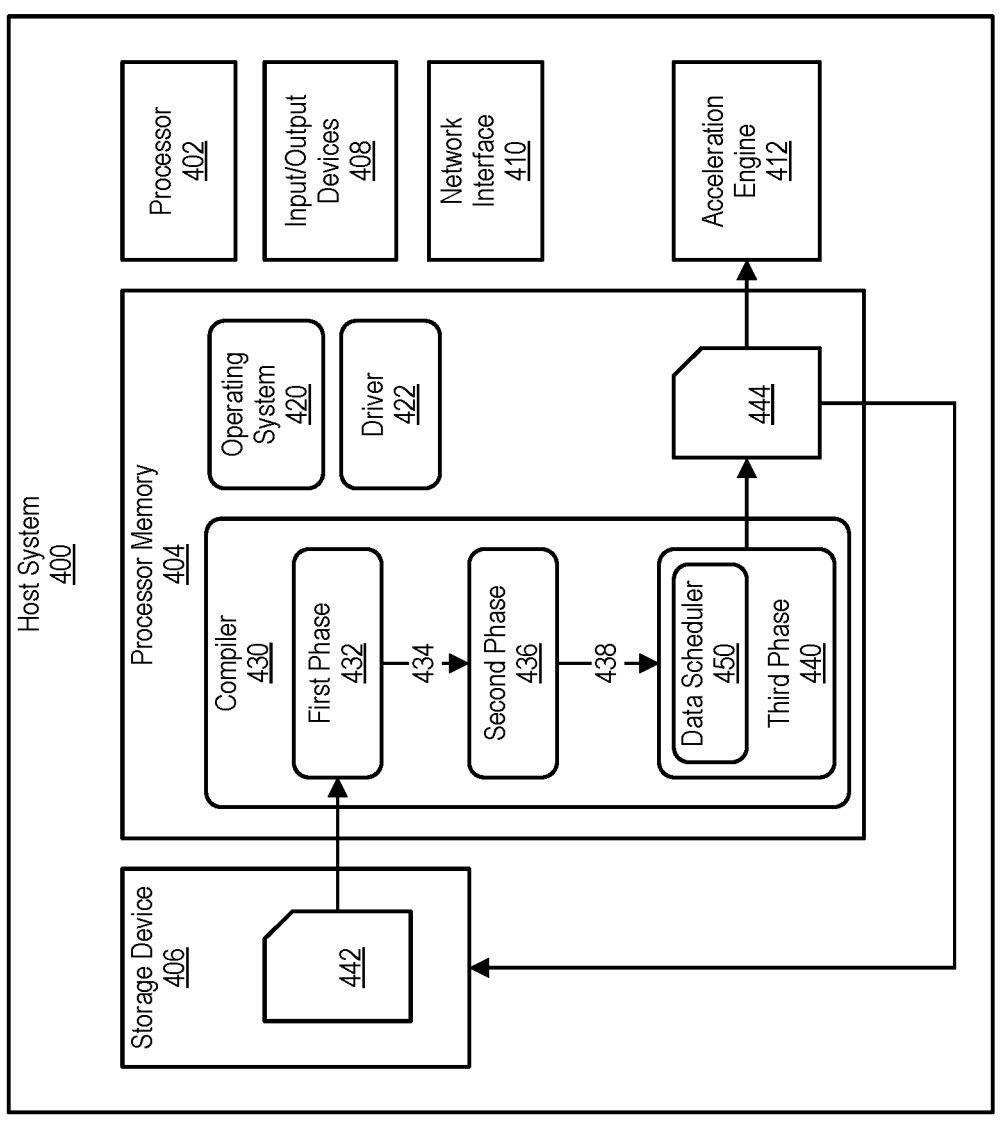
FIG. 4 includes a block diagram illustrating an example of a host system that may be used to execute a compiler.

FIG. 4 includes a block diagram illustrating an example of a host system 400 that may be used to execute a compiler 430. The illustrated host system 400 is an example of a computing device, and includes a processor 402, a processor memory 404, at least one storage device 406, various Input/Output (I/O) devices 408, and at least one network interface 410. In the example of FIG. 4, host system 400 also includes an acceleration engine 412, which is an integrated circuit device that can accelerate certain operations or computations performed by host system 400. In various examples, host system 400 can be implemented as a server in a data center, a desktop computer, a laptop computer, a tablet computer, or a smartphone, among other examples. In some examples, operations or components discussed below as being performed or included in host system 400 can be performed or included in other computer devices. For example, compiler 430 can execute on host system 400 while acceleration engine 412 is located at a different host system.

Processor 402 is an integrated circuit device that can execute program code, in the form of instructions. The program code can be for various software applications or tools, such as an operating system 420 or the illustrated compiler 430. While processor 402 is executing a program, the instructions for the program can be stored in processor memory 404. The instructions can also be stored elsewhere, such as on storage device 406, and can be loaded into processor memory 404 when needed by processor 402. Processor 402 can also use processor memory 404 for temporary storage of other data on which processor 402 is operating. In various examples, processor memory 404 is a volatile memory type, such as a type of Random Access Memory, though non-volatile memory types can, alternatively or additionally, be used for processor memory 404.

Storage device 406 is an example of a device that can include non-volatile memory. For example, storage device 406 can be a magnetic disk drive, a solid state drive, or an optical drive, among other examples. Storage device 406 can further be non-transitory, such that program code and other data stored on storage device 406 remains present when storage device 406 is not powered on.

Storage device 406 is one example of a peripheral device, which are components that can be coupled to host system 400 to add functionality to host system 400. Other examples of peripheral devices include I/O devices 408 and network interface 410. I/O devices 408 can include user input and output devices, such as keyboards, mice, touch screens, microphones, display screens, speakers, printers, and scanners, among other examples. Network interface 410, which can be implemented using a network interface card, can provide access to one or more networks. Network interface 410 can include, for example, a physical port for connecting a network cable and/or wireless antennas for communicating with Wi-Fi and/or cellular networks. Network interface 410 can also be described as an I/O device.

Acceleration engine 412 is also another type of peripheral device or I/O device. Acceleration engine 412 is a device that is purpose-built to perform certain operations that can be performed by processor 402, but can be performed faster by acceleration engine 412. For example, acceleration engine 412 can be a neural network accelerator, and, as such, may be able to perform the large scale, parallel computations of a neural network more efficiently than when the computations are performed by processor 402. As another example, acceleration engine 412 can be a graphics processing unit (GPU), and may be optimized to perform the computations needed for graphics rendering. Other examples of devices that can be implemented by acceleration engine 412 include cryptographic accelerators, compression and decompression accelerators, 3-D accelerators, regular expression accelerators, security accelerators, and others.

In various examples, acceleration engine 412 can execute program code to perform certain operations. For example, when acceleration engine 412 is a neural network accelerator, acceleration engine 412 can be programmed to execute a particular neural network, such as one that performs image recognition or one that performs machine translation. As a further example, to support the execution of a neural network, acceleration engine 412 can be programed to perform operations such as copying data for the neural network from processor memory 404 (for example) into acceleration engine 412, copying input data for the neural network from processor memory 404 into acceleration engine 412, and/or copying results from acceleration engine 412 into processor memory 404, among other examples.

To generate program code for acceleration engine 412, in various examples, host system 400 can execute compiler 430. Compilers, in general, are software programs that translate program code written in a human-readable language into a format (e.g., machine instructions) that can be read and processed by an integrated circuit device. In the example shown in FIG. 4, acceleration engine 412 is a neural network accelerator and compiler 430 is for compiling a neural network description into instructions to be executed by acceleration engine 412. When acceleration engine 412 implements a different type of accelerator, another compiler can be used.

Compiler 430 can be activated, for example, when operating system 420 receives keyboard, mouse, touchscreen, voice commands, or other inputs from the I/O devices 408. The inputs can further include parameters for compiler 430, such as input code 442 to compile and configuration options for the compilation process. Once compiler 430 is activated, processor 402 can load the instructions for compiler 430 into processor memory 404, and can execute the instructions.

In the example shown in FIG. 4, compiler 430 includes a first stage 432, a second stage 436, and a third stage 440, which each perform different operations to produce compiled code 444. In other examples, compiler 430 can combine the operations of first stage 432, second stage 436, and/or third stage 440 into fewer stages, or can divide the operations of one of the stages into multiple stages.

First stage 432 can receive and process input code 442. Input code 442 can describe a program in a high-level programming language, such as Java, C++, or Tensorflow, among many other examples. Input code 442 can describe, for example, steps to perform image recognition, speech recognition, machine translation, or other operations. Input code 442 can be obtained, for example, from storage device 406. Alternatively, though not illustrated here, input code 442 may be located in processor memory 404 or can be obtained from a network location, using network interface 410. Processing of input code 442 can include sorting the operations described in input code 442 into layers, where the outputs of one layer provide the inputs to a next layer. Processing can also include identifying steps to be performed by the processor 402, rather than by the acceleration engine 412. For example, the processor 402, through the execution of a driver 422, may need to perform steps such as configuring DMA descriptors for moving data into or out of the acceleration engine 412, among other examples. Output 434 of first stage 432 can be organized, for example, in the layers, nodes, and connections between nodes of a neural network.

Second stage 436 can perform intermediate processing on this output 434. For example, the operations performed in any one layer, or at any one node in a layer, may be too many for acceleration engine 412 to perform at the same time. Acceleration engine 412 may, for example, have a limited amount of locale storage space for the data needed for a computation, or the computations may be more than acceleration engine 412 can perform at one time. In this example, first stage 432 can break the operations of the layer or node down into smaller operations, which can fit into the acceleration engine's local memory and/or can fit into the computing capacity of acceleration engine 412. Processing of output 434 of first stage 432 can include other steps, such as scheduling, or determining the order in which acceleration engine 412 and/or processor 402 will perform operations, among other examples.

In various examples, output 438 of second stage 436 includes the various steps to be performed by components of acceleration engine 412, in the order that the steps are to be performed. Output 438 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

Third stage 440 can operate on output 438 of second stage 436, and perform various steps before producing the instructions that are to be executed by acceleration engine 412. These steps can include, for example, removing redundant dependencies, resolving or handling dependencies between nodes by inserting synchronization instructions into the code, identifying possibly optimizations in memory usage or memory bandwidth usage, and other operations. In some examples, third stage 440 can include a data scheduler 450 to determine the order in which instructions are executed by acceleration engine 412.

The output of third stage 440 is compiled code 444, which may include machine instructions in binary format. In some examples, compiled code 444 can be stored in processor memory 404. Alternatively or additionally, compiled code 444 can be copied to storage device 406 or to a network location. As noted above, acceleration engine 412 may be located at a different host system, in which case the compiled code 444 can be sent over network interface 410 to the other host system.

In the example shown in FIG. 4, host system 400 can execute a driver 422, which can also be referred to as a device driver or runtime driver, that manages acceleration engine 412. Driver 422 can provide an interface between applications executing on host system 400 (or on another host system) and acceleration engine 412. For example, driver 422 can provide an Application Program Interface (API) that defines functions for feeding input data to acceleration engine 412 and defining the operation to perform on the input data. In this and other examples, driver 422 can configure acceleration engine 412 to perform the operation. For example, driver 422 can identify a neural network that acceleration engine 412 is to execute, as well as the location in processor memory 404 or on storage device 406 where compiled code 444 for the neural network is located. Driver 422 can further load into acceleration engine 412 or cause acceleration engine 412 to load compiled code 444, can load or cause acceleration engine 412 to load the input data on which the neural network is to operate, and/or can cause acceleration engine 412 to being executing on the input data. Once acceleration engine 412 has finished, acceleration engine 412 can notify driver 422, and driver 422 can deliver a result back to the application that requested the result.

Data transfers between the local memory of a neural network processor and the system memory, including loading input tensors from the system memory to the local memory and saving intermediate output tensors from the local memory to the system memory to make room for other input tensors for other operations may be performed using a direct memory access (DMA) engine, in order to limit the involvement of the host processor. A DMA engine may use memory descriptors to perform the data transfers.

Figure 5:
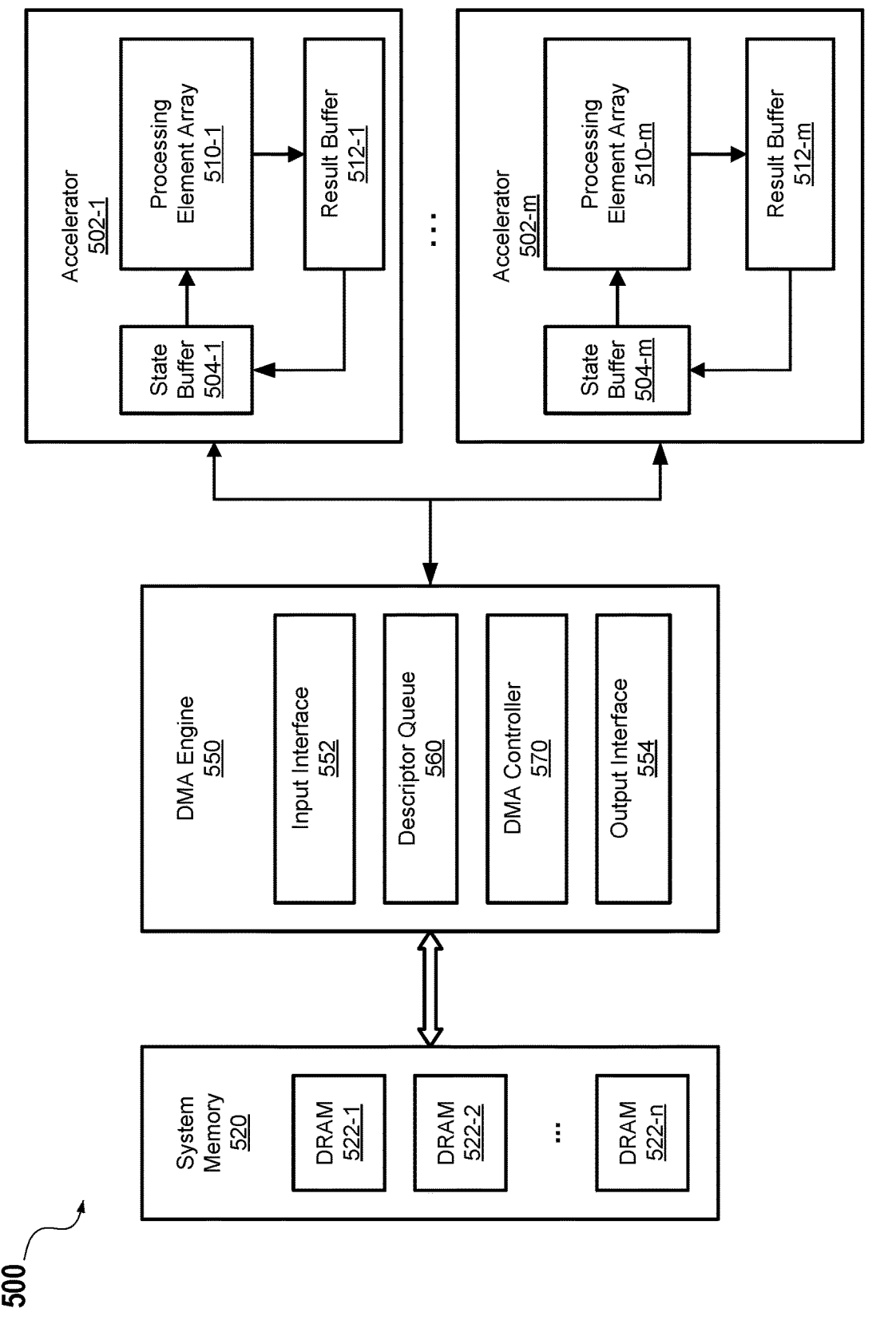
FIG. 5 illustrates an example of a computing system according to certain embodiments.

FIG. 5 illustrates an example of a computing system 500 according to certain embodiments. In the illustrated example, computing system 500 includes a DMA engine 550, system memory 520, and one or more accelerators 502-1 to 502-*m*. Computing system 500 may include other components not specifically shown, such as a host processor. Accelerators 502-1 may be a neural network accelerator (e.g., a neural network processor or tensor processing unit), and may include a processing element array 510-1 (e.g., a systolic array), a state buffer 504-1, and a result buffer 512-1 as described above with respect to FIG. 3. Processing element array 510-1 may include an array of processing elements arranged in rows and columns. Each processing element is capable of performing a multiply-and-add operation. State buffer 504-1 may be used to store input data such as feature map values and weight values for processing element array 510-1, and/or may be used to store intermediate outputs that may be used in subsequent layers. During operation, the input data may be shifted into processing element array 510-1 from state buffer 504-1 along the rows of the array. The computation results of the processing elements are accumulated along the column direction. The output data of the columns (e.g., partial sum) may be stored in result buffer 512-1, and may be further processed by other processing engines (such as the pooling engine and/or activation engine not shown in FIG. 5) and saved to state buffer 504-1. Other accelerators in computing system 500 such as accelerator 502-*m* may have a similar architecture as accelerator 502-1 described above.

In many instances, tensors processed by computing system 500 may have thousands or even millions of elements. Because not all elements of a tensor can fit within accelerators 502-1 to 502-*n* at the same time, system memory 520 can be used to store data that are not currently being processed in accelerators 502-1 to 502-*m*. System memory 520 can also be used to facilitate data exchanges between accelerators 502-1 to 502-*m* (e.g., for gradient exchange during training). As computations are carried out, data used by accelerators 502-1 to 502-*m* may be transferred from system memory 520 into the corresponding accelerator, and data not being used by accelerators 502-1 to 502-*m* can be transferred from the respective accelerator to system memory 520. System memory 520 can be implemented using one or more DRAM devices 522-1 to 522-*n* and/or other types of memory devices. In other implementations, system memory can be implemented, for example, using static random access memory (SRAM), flash memory, 3D cross-point memory, or any combination thereof.

In some implementations, data transfers between system memory 520 and other components of computing system 500 may involve a host processor (not shown) to issue read and write commands to system memory 520. Such memory accesses through a host processor may use processing time of the host processor and may incur unnecessary latency, especially when the host processor is not a consumer or generator of the data being accessed. To bypass the host processor, DMA engine 550 can be used to directly exchange data between system memory 520 and accelerators 502-1 to 502-*m*.

DMA engine 550 may include a DMA controller 570, a descriptor queue 560, an input interface 552, and an output interface 554. Descriptor queue 560 can be implemented as, for example, a circular buffer or ring queue, and can be configured to store a set of memory descriptors used by DMA engine 550 to exchange data between system memory 520 and other components of computing system 500. For example, when an accelerator 502-*m* has data to store in system memory 520 or is requesting data from system memory 520, a memory descriptor providing a source address and a destination address can be placed in descriptor queue 560 to initiate the transfer. A memory descriptor may also include other information, such as the number of elements to transfer, data size, transfer unit, transfer type, and the like. In some implementations, DMA engine 550 may include multiple descriptor queues. For example, DMA engine 550 may include a descriptor queue for writing data into system memory 520, and a descriptor queue for reading data from system memory 520. In some implementations, DMA engine 550 may implement multiple data transmission channels (e.g., different channels for different components of computing system 500), and each transmission channel may have its own descriptor queue or pair of descriptor queues for both transfer directions. Furthermore, DMA engine 550 may implement a destination descriptor queue that can be used to facilitate multicast operations.

DMA controller 570 may be used to manage the operations of DMA engine 550. For example, DMA controller 570 may maintain head and tail pointers for descriptor queue 560 of DMA engine 550. DMA controller 570 may monitor the number of available entries in descriptor queue 560 to prevent queue overflow. In some implementations, DMA controller 570 may also maintain completion statuses and generate interrupts for components of computing system 500. DMA controller 570 may process the memory descriptors in descriptor queue 560 by reading data from the source designated in the memory descriptor via input interface 552, and writing the data to a target destination designated in the memory descriptor via output interface 554. As such, input interface 552 may issue read operations to obtain the data being transferred, and output interface 554 may issue write operations to place the data into the target destination. In some implementations, DMA controller 570 can also perform a multicast operation by reading a data set once and writing the data set to multiple destinations.

As described above, DMA engine 550 may be shared by multiple (e.g., 4 or more) processing engines (e.g., accelerators 502-1 to 502-*m*) in computing system 500 and may include interfaces that may have limited bandwidth (e.g., about 128 or 256 B/cycle). Retrieving the memory descriptors, initializing the DRAM access, and regularly refreshing the DRAM may incur additional overhead for the DMA transfers. Thus, DMA accesses may have a long latency, a low bandwidth, and a low throughput. In many applications, the size of input tensors used by a neural network model and output tensors generated by the neural network model can be hundreds of times greater than the capacity of the local memory. Thus, a processing engine may need to access the system memory tens or hundreds of times through DMA engine 550 to transfer the small tensors. Due to the latency and overhead of each DMA access, accessing the system memory tens or hundreds of times through DMA engine 550 can cause prolonged latencies and prevent practical applications of the neural network to some real-time tasks, such as natural language processing or autonomous driving.

According to certain embodiments, to reduce the overhead of performing a large number of DMA transfers, DMA coalescing may be performed during the compilation of a neural network model to coalesce a group of small DMA operations (e.g., DMA save or load operations with less than about 256 B/partition) into a large DMA operation (e.g., a DMA save or load operation with about 2 KB/partition). The DMA coalescing may be performed after the resource allocation and instruction generation, and may include analyzing the local memory allocation and usage by the instructions, arranging sources or destinations of a group of DMA operations into a contiguous block in the local memory, and modifying the instructions to, for example, replace the group of DMA operations with a large DMA operation that uses the contiguous block as the source or destination, replace some DMA operations with operations that can be performed without using DMA (e.g., tensor copy operations), change the local memory addresses specified in some instructions, or any combination thereof.

Figure 6:
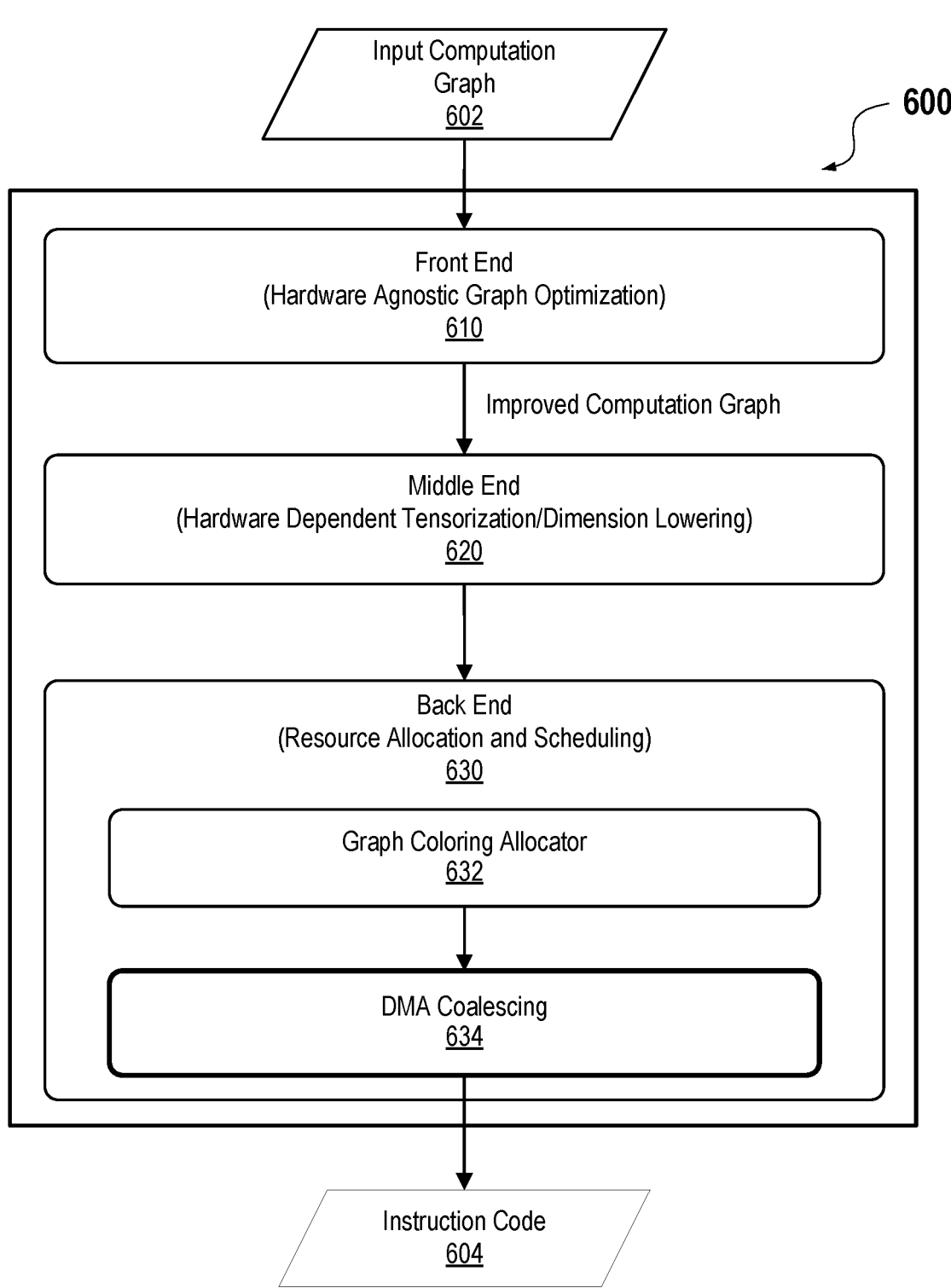
FIG. 6 illustrates an example of a compiler including multiple processing stages for compiling a neural network model according to certain embodiments.

FIG. 6 illustrates an example of a compiler 600 including multiple processing stages for compiling a neural network model according to certain embodiments. Compiler 600 may be an example of compiler 430 shown in FIG. 4. In the illustrated example, compiler 600 may include a front end 610, a middle end 620, and a back end 630, each configured to perform different operations in a process of generating instruction code based on an input neural network model, such as an input computation graph that describes the neural network model. Front end 610, middle end 620, and back end 630 may be executed by one or more processors in a host system, such as processor 402 of host system 400. It is noted that the division of operations of compiler 600 into stages such as front end 610, middle end 620, and back end 630 is for illustration purposes only, in order to facilitate the description of compiler 600. Other arrangements or groupings of the different operations of compiler 600 in the compilation flow may be used to implement the operations of compiler 600.

In the example shown in FIG. 6, front end 610 may receive a neural network model that is described by an input computation graph 602. In other embodiments, the neural network model may be described in a high-level programming language, such as Java, C++, MATLAB, Python, or Tensorflow, among many other examples. Input computation graph 602 may include a plurality of nodes and directed connections (edges) between the nodes. Each node may represent a neural network operation, such as a data transfer (or memory load) operation or a computation operation (e.g., convolution, activation, pooling, or residual add). The connections and the directions of the connections between the nodes may indicate data dependency. In some embodiments, each node of an input computation graph may represent a tensor, a matrix, a vector, or a scalar value, and each edge may represent a function and data dependency.

Front end 610 may perform a general optimization of input computation graph 602, regardless of the underlying hardware that may be used to implement the neural network model. The input computation graph optimization may include, for example, applying rule-based transformations to fuse some operations such that intermediate results do not need to be maintained, substitute some operations, and/or prune some unnecessary operations. The input computation graph optimization may simplify graph, optimize arithmetic operations, optimize data dependency, optimize graph layout, and the like. The output of front end 610 may be an improved computation graph with reduced computation, memory usage, and/or data transfer.

Middle end 620 may, based on the configuration of the underlying hardware (e.g., accelerator 302 or computing system 500) for implementing the neural network model and the improved computation graph, break tensors and tensor operations at the graph nodes into smaller tensors and smaller tensor operations that can fit into a processing engine's local memory (e.g., memory subsystem 304 of accelerator 302) and/or can fit into the computing capacity of the processing engine (e.g., PE array 310 of accelerator 302). The output of middle end 620 may include operations to be performed by various components of a computing system, including, for example, memory operations, computations, and other operations, and may also indicate dependencies between the operations, such as data dependencies, memory dependencies, or operational dependencies, among other examples.

Back end 630 may perform processing such as resource allocation, instruction scheduling, and code editing, and may generate instructions that can be executed by the computing system. For example, back end 630 may include a graph coloring allocator (GCA) 632 that may determine where to store data at runtime (e.g., inside or outside local memory). If some data is to be stored in the local memory, GCA 632 may determine the location (e.g., partitions) of the local memory for storing the data and/or may determine the duration that the data may remain at the location of the local memory. For example, certain data may need to be saved into a remote memory device during runtime to make room for other data and may need to be reloaded into the local memory for later operations in a spilling and reloading process. In some embodiments, GCA 632 may determine the live ranges of tensors, build an interference graph, merge the live ranges of non-interfering tensors, compute the cost of spilling a tensor, insert spill instructions, and assign local memory locations to tensors. In some embodiments, GCA 632 may determine that it may be more efficient to recalculate a tensor (referred to as rematerialization) instead of spilling and reloading the tensor. Back end 630 may also determine the order in which the instructions are to be executed, resolve dependencies between operations of different processing engines of a computing system. The output of back end 630 is compiled instruction code that can be executed by the computing system.

The instruction code associated with local memory allocation may include DMA data transfer instructions, such as DMA save (or store) instructions and DMA load (or reload) instructions. To reduce the number of DMA data transfer operations and the associated overhead, back end 630 may also include a DMA coalescing block 634 that may coalesce a group of small DMA operations (e.g., DMA save or load instructions with less than about 256 B/partition) into a large DMA operation (e.g., a DMA save or load instruction with about 2 KB/partition). DMA coalescing block 634 may analyze the local memory allocation and usage by the generated instructions and modify the instructions. For example, DMA coalescing block 634 may change the local memory allocations for some tensors and/or move some tensors within the local memory such that the sources of a group of DMA save instructions or the destinations of a group of DMA load instructions may be arranged into a contiguous local memory block without violating other local memory constraints, and thus the group of DMA save instructions or the group of DMA load instructions may be coalesced into a single DMA save instruction or a single DMA load instruction. DMA coalescing block 634 may change the local memory allocations for some tensors by changing the memory addresses specified in the corresponding instructions. DMA coalescing block 634 may generate tensor copy instructions to move some tensors within the local memory, for example, to produce a contiguous unused local memory block. The output of DMA coalescing block 634 may be instruction code 604 that may be performed by a computing system.

The tensor copy instructions described above may be performed by a processing engine other than the DMA engine of the computing system, such as pooling engine 318 or activation engine 316 of accelerator 302. For example, pooling engine 318 may read from a first region of the local memory (e.g., memory subsystem 304) and write the read data to a second region in the local memory. In some embodiments, the first region and the second region may have the same two-dimensional shape (e.g., the same number of partitions and the same number of bytes in each partition). In some embodiments, the first region and the second region may have different two-dimensional shapes, such as different numbers of partitions and different numbers of bytes in each partition, but may have the same total size (number of partitions×number of bytes in each partition). Pooling engine 318 or another processing engine (e.g., activation engine 316) may change the shape of the tensor when writing the tensor read from the first region to the second region. Pooling engine 318 may be connected to memory subsystem 304 through a bus interface 330 that may read from or write to multiple partitions of the local memory in parallel. In one example, bus interface 330 between pooling engine 318 and memory subsystem 304 may write to each partition of memory subsystem 304 at a speed of 8 bytes per four clock cycles. There is no initialization or refreshing for the tensor copy operations. The bus interface may be dedicated for communications between pooling engine 318 and memory subsystem 304, and thus there may not be bandwidth competition between tensor copy operations and other operations. As such, the tensor copy instructions may be performed at a high speed and with a low latency and a short execution time.

Figures 7A, 7B, 7C, 7D:
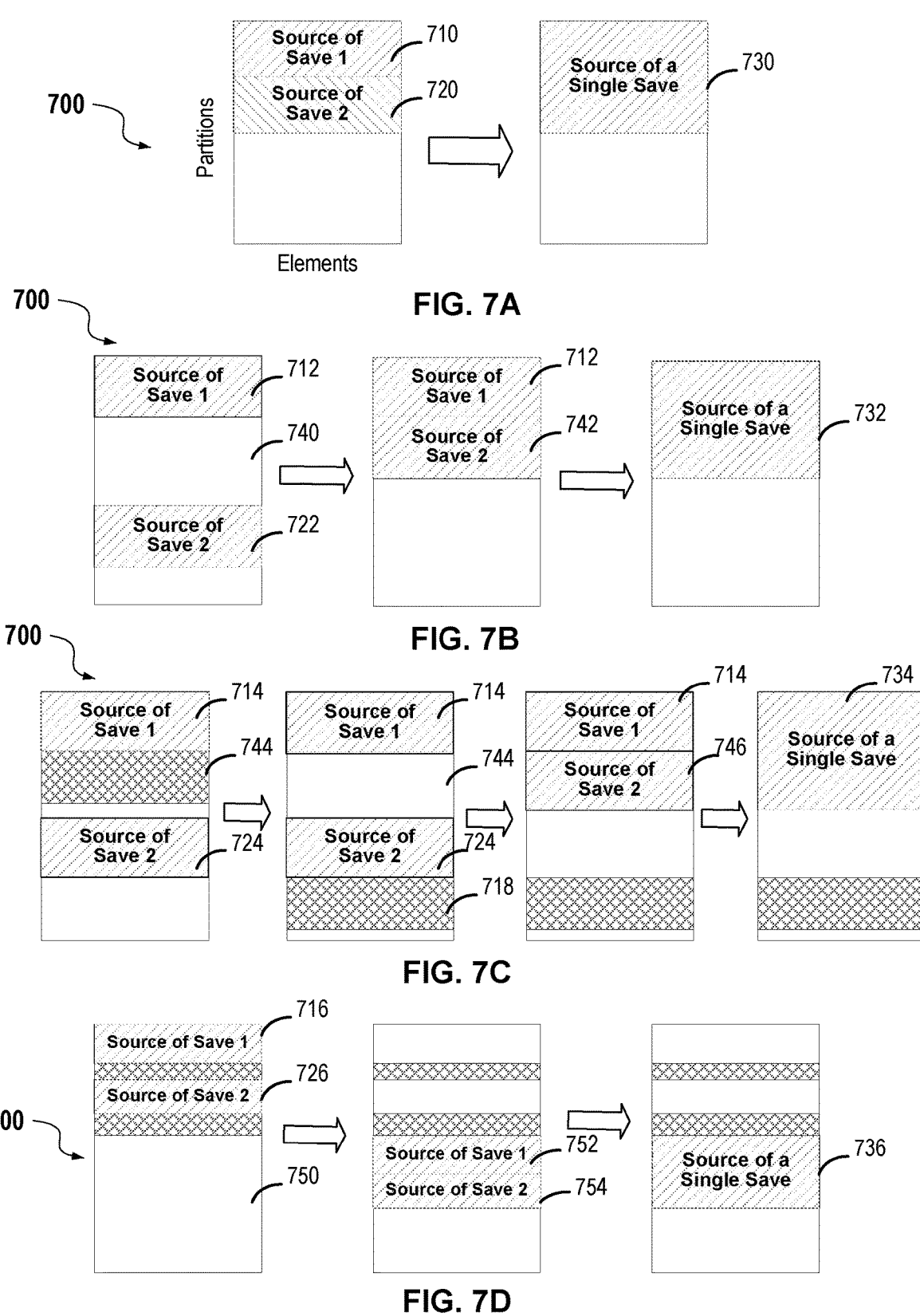
FIGS. 7A-7H illustrate examples of coalescing direct memory access (DMA) save instructions according to certain embodiments.

FIG. 7A illustrates an example of coalescing DMA save instructions according to certain embodiments. FIG. 7A shows a local memory 700, such as memory subsystem 304 of accelerator 302 or state buffer 504-1 of accelerator 502-1. Local memory 700 may include multiple partitions (e.g., 128 partitions), where each partition may include a plurality of elements, such as about 256 KB. In the compiled instruction code (e.g., after GCA 632), the source of a first DMA save instruction may be at a region 710 of local memory 700 and the destination of the first DMA save instruction may be at a first DRAM block. The source of a second DMA save instruction may be at a region 720 of local memory 700 and the destination of the second DMA save instruction may also be at the first DRAM block. Region 720 may be adjacent to region 710 in local memory 700. In some embodiments, the source of the first DMA save instruction may be an output of a first tensor operation. In some embodiments, the source of the second DMA save instruction may be an output of a second tensor operation. In some embodiments, the first tensor operation and the second tensor operation may be split from a same large tensor operation, and the source of the first DMA save instruction and the source of the second DMA save instruction may be two tiles of a large tensor.

In the example shown in FIG. 7A, the DMA coalescing block (e.g., DMA coalescing block 634) of the compiler may analyze the compiled instruction code that includes the first DMA save instruction and the second DMA save instruction, and may determine that the first DMA save instruction and the second DMA save instruction write to a same DRAM block and that region 710 and region 720 are in adjacent regions of local memory 700 and thus form a contiguous region 730. In addition, the DMA coalescing block of the compiler may determine that region 710 is not used to store other data between the first DMA save instruction and the second DMA save instruction. Therefore, delaying the first DMA save instruction until the second DMA save instruction may not interfere with other operations. As such, the DMA coalescing block may replace the first DMA save instruction and the second DMA save instruction with a coalesced DMA save instruction to be performed at the scheduled time of the second DMA save instruction, where the source of the coalesced DMA save instruction is at region 730 of local memory 700. Even though only two DMA save instructions are shown as coalesced in the illustrated example, a group of DMA save instructions including two or more DMA save instructions may be coalesced if the group of DMA save instructions write to a same DRAM block, the sources of the group of DMA save instructions are in adjacent regions of the local memory, and delaying the group of DMA save instructions until the last DMA save instruction in the group would not interfere with other operations.

FIG. 7B illustrates another example of coalescing DMA save instructions according to certain embodiments. In the example shown in FIG. 7B, in the compiled instruction code, the source of a first DMA save instruction may be at a region 712 of local memory 700 and the destination of the first DMA save instruction may be at a first DRAM block. The source of a second DMA save instruction may be at a region 722 of local memory 700 and the destination of the second DMA save instruction may also be at the first DRAM block. Region 722 may not be adjacent to region 712. In some embodiments, the source of the first DMA save instruction may be an output of a first tensor operation. In some embodiments, the source of the second DMA save instruction may be an output of a second tensor operation. In some embodiments, the first tensor operation and the second tensor operation may be split from a large tensor operation, and the source of the first DMA save instruction and the source of the second DMA save instruction may be two tiles of a large tensor.

In the example illustrated in FIG. 7B, the DMA coalescing block (e.g., DMA coalescing block 634) of the compiler may analyze the compiled instruction code including the first DMA save instruction and the second DMA save instruction, and may determine that the first DMA save instruction and the second DMA save instruction write to a same DRAM block. The DMA coalescing block may also determine that region 712 and region 722 are not in adjacent regions of local memory 700, but a region 740 adjacent to region 712 may not be used during and/or before the second DMA save instruction (e.g., during the second tensor operation that generates the source of the second DMA save instruction). In addition, the DMA coalescing block of the compiler may determine that region 712 is not used to store other data between the first DMA save instruction and the second DMA save instruction. Thus, delaying the first DMA save instruction until the second DMA save instruction may not interfere with other operations. As such, the DMA coalescing block may generate and/or modify instructions to move the source of the second DMA save instruction to a region 742 adjacent to region 712 in local memory 700, for example, by changing the instruction of the second tensor operation to save the output of the second tensor operation to region 742, or by moving data in region 722 to region 742 at a time before the scheduled time of the second DMA save instruction using a tensor copy instruction described above. In some embodiments, the DMA coalescing block may also modify instructions that use the source of the second DMA save instruction such that these instructions may use data in region 742 (instead of region 722). Region 742 and region 712 may form a contiguous region 732 in local memory 700. The DMA coalescing block may remove the first DMA save instruction and replace the second DMA save instruction with a coalesced DMA save instruction, the source of which is at region 732 of local memory 700. In some embodiments, instead of moving the source of the second DMA save instruction to region 742, the source of the first DMA save instruction may be moved to a region of region 740 that is adjacent to region 722. Even though only two DMA save instructions are shown as coalesced in the illustrated example, a group of DMA save instructions including two or more DMA save instructions may be coalesced if the group of DMA save instructions write to a same DRAM block, the sources of the group of DMA save instructions can be directly written or moved to adjacent regions of the local memory without violating other memory constraints, and delaying the group of DMA save instructions until the last DMA save instruction in the group would not interfere with other operations.

FIG. 7C illustrates another example of coalescing DMA save instructions according to certain embodiments. In the example shown in FIG. 7C, in the compiled instruction code, the source of a first DMA save instruction may be at a region 714 of local memory 700 and the destination of the first DMA save instruction may be at a first DRAM block. The source of a second DMA save instruction may be at a region 724 of local memory 700 and the destination of the second DMA save instruction may also be at the first DRAM block. Region 724 may not be adjacent to region 714, which may be adjacent to a region 744 that may store other data at and/or before the time of the second DMA save instruction. In some embodiments, the source of the first DMA save instruction may be an output of a first tensor operation. In some embodiments, the source of the second DMA save instruction may be an output of a second tensor operation. In some embodiments, the first tensor operation and the second tensor operation may be split from a large tensor operation, and the source of the first DMA save instruction and the source of the second DMA save instruction may be two tiles of a large tensor.

In the example illustrated in FIG. 7C, the DMA coalescing block of the compiler may analyze the compiled instruction code including the first DMA save instruction and the second DMA save instruction, and may determine that the first DMA save instruction and the second DMA save instruction write to a same DRAM block. The DMA coalescing block may also determine that region 714 and region 724 are not in adjacent regions of local memory 700, and a region 744 adjacent to region 714 may be used by another operation during and/or before the second DMA save instruction (e.g., during the second tensor operation that generates the source of the second DMA save instruction). In addition, the DMA coalescing block of the compiler may determine that region 714 is not used to store other data between the first DMA save instruction and the second DMA save instruction. Thus, delaying the first DMA save instruction until the second DMA save instruction may not interfere with other operations. The DMA coalescing block may generate and/or modify instructions to move data stored in region 744 (or to be stored in region 744) to a region 718, for example, by changing the instruction of the tensor operation that saves the output to region 744 to save the output to region 718 instead, or by moving data in region 744 to region 718 (e.g., before the second tensor operation or the second DMA save instruction) using a tensor copy instruction described above. The DMA coalescing block may also modify subsequent instructions that originally use data stored in region 744 such that the instructions may use data stored in region 718 instead. The DMA coalescing block may also generate or modify instructions to move the source of the second DMA save instruction to a region 746 adjacent to region 714 in local memory 700, for example, by changing the instruction of the second tensor operation to save the output of the second tensor operation to region 746, or by moving data in region 724 to region 746 using a tensor copy instruction described above. In some embodiments, the DMA coalescing block may also modify instructions that use the source of the second DMA save instruction such that these instructions may use data in region 746 (instead of region 724). Region 746 and region 714 may form a contiguous region 734 in local memory 700. The DMA coalescing block may delete the first DMA save instruction and replace the second DMA save instruction with a coalesced DMA save instruction, the source of which is at region 734 of local memory 700. In some embodiments, instead of moving the source of the second DMA save instruction to region 746, the source of the first DMA save instruction may be moved to a region of region 744 that is adjacent to region 724. Even though only two DMA save instructions are shown as coalesced in the illustrated example, a group of DMA save instructions including two or more DMA save instructions may be coalesced if the group of DMA save instructions write to a same DRAM block, the sources of the group of DMA save instructions can be directly written or moved to adjacent regions of the local memory without violating other memory constraints, and delaying the group of DMA save instructions until the last DMA save instruction in the group would not interfere with other operations.

FIG. 7D illustrates yet another example of coalescing DMA save instructions according to certain embodiments. In the example shown in FIG. 7D, in the compiled instruction code, the source of a first DMA save instruction may be at a region 716 of local memory 700 and the destination of the first DMA save instruction may be at a first DRAM block. The source of a second DMA save instruction may be at a region 726 of local memory 700 and the destination of the second DMA save instruction may also be at the first DRAM block. Region 726 may not be adjacent to region 716. In some embodiments, the source of the first DMA save instruction may be an output of a first tensor operation. In some embodiments, the source of the second DMA save instruction may be an output of a second tensor operation. In some embodiments, the first tensor operation and the second tensor operation may be split from a large tensor operation, and the source of the first DMA save instruction and the source of the second DMA save instruction may be two tiles of a large tensor.

In the example illustrated in FIG. 7D, the DMA coalescing block of the compiler may analyze the compiled instruction code that includes the first DMA save instruction and the second DMA save instruction, and may determine that the first DMA save instruction and the second DMA save instruction write to a same DRAM block. The DMA coalescing block may also determine that region 716 and region 726 are not in adjacent regions of local memory 700, and that the region between region 716 and region 726 may be smaller than region 726 and region 716 and/or may be used by another operation during and/or before the second DMA save instruction (e.g., during the second tensor operation that generates the source of the second DMA save instruction). In addition, the DMA coalescing block of the compiler may determine that a region 750 (or a combination of region 716 and region 750) may be used to store the source of the first DMA save instruction between the first DMA save instruction and the second DMA save instruction. Thus, delaying the first DMA save instruction until the second DMA save instruction may not interfere with other operations. Region 750 may be large enough to store both the source of the first DMA save instruction and the source of the second DMA save instruction, and thus may also be used to store the source of the second DMA save instruction during and/or before the second DMA save instruction (e.g., during the second tensor operation that generates the source of the second DMA save instruction).

Based on the analysis, the DMA coalescing block may generate or modify instructions to directly write or move the source of the first DMA save instruction to a region 752 in region 750, for example, by changing the instruction of the first tensor operation to save the output of the first tensor operation to region 752, or by moving data in region 716 to region 752 using a tensor copy instruction described above. The DMA coalescing block may also generate or modify instructions to directly write or move the source of the second DMA save instruction to a region 754 in region 750, for example, by changing the instruction of the second tensor operation to save the output of the second tensor operation to region 754, or by moving data in region 726 to region 754 using a tensor copy instruction described above. In some embodiments, the DMA coalescing block may modify instructions that use the source of the first DMA save instruction such that these instructions may use data in region 752 (instead of region 716). In some embodiments, the DMA coalescing block may modify instructions that use the source of the second DMA save instruction such that these instructions may use data in region 754 (instead of region 726). Region 752 and region 754 may form a contiguous region 736 in local memory 700. The DMA coalescing block may delete the first DMA save instruction and replace the second DMA save instruction with a coalesced DMA save instruction, the source of which is at region 736 of local memory 700. Even though only two DMA save instructions are shown as coalesced in the illustrated example, a group of DMA save instructions including two or more DMA save instructions may be coalesced if the group of DMA save instructions write to a same DRAM block, the sources of the group of DMA save instructions can be directly written or moved to adjacent regions of the local memory, and delaying the group of DMA save instructions until the last DMA save instruction in the group would not interfere with other operations.

Figures 7E, 7F, 7G, 7H:
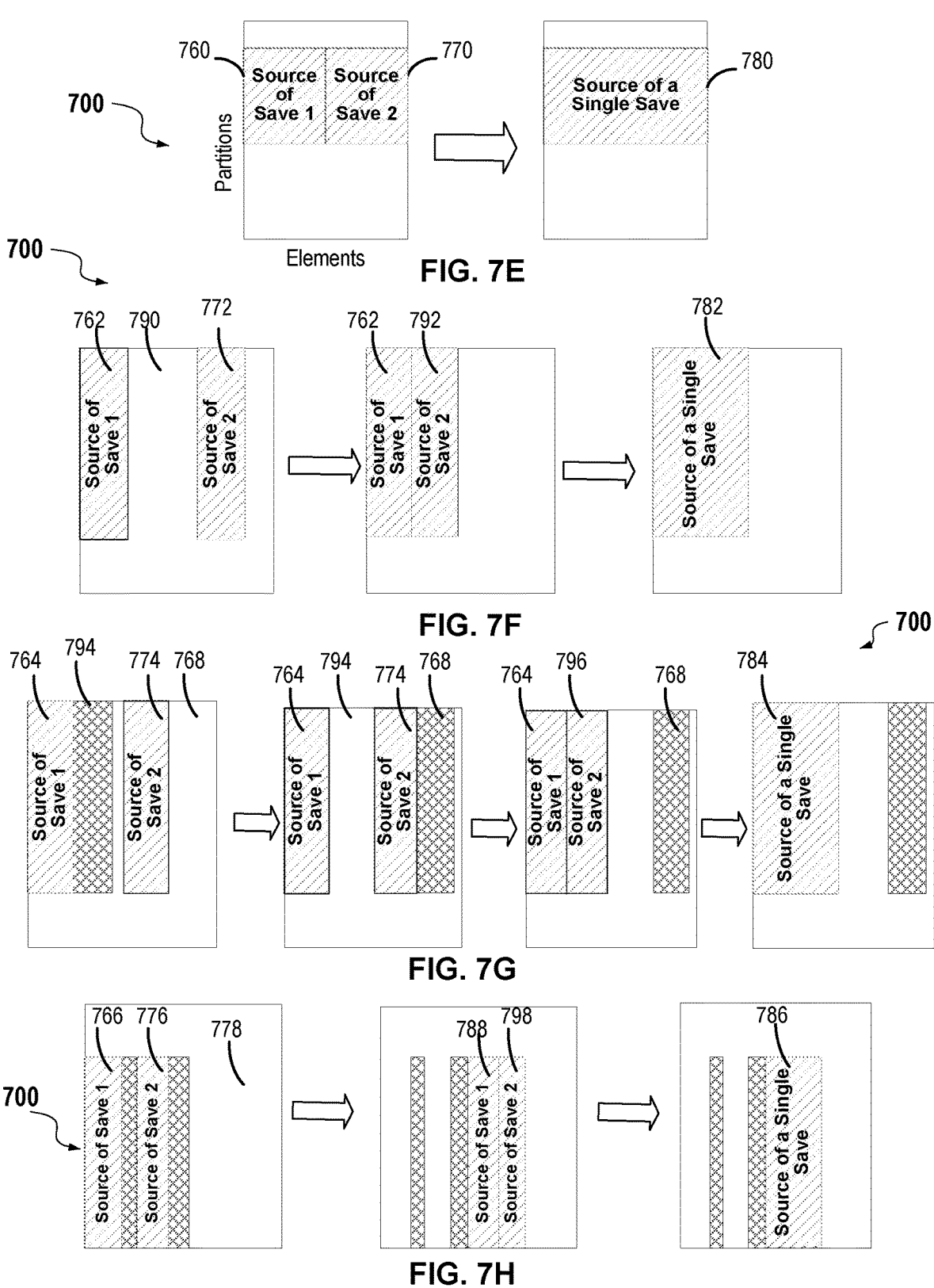

FIG. 7E illustrates an example of coalescing DMA save instructions according to certain embodiments. In the compiled instruction code (e.g., after GCA 632), the source of a first DMA save instruction may be at a region 760 of local memory 700 and the destination of the first DMA save instruction may be at a first DRAM block. The source of a second DMA save instruction may be at a region 770 of local memory 700 and the destination of the second DMA save instruction may also be at the first DRAM block. Region 770 may be adjacent to region 760 in local memory 700. In the illustrated example, region 760 and region 770 may be at different element ranges of a same partition range. Region 770 and region 760 may form a contiguous region 780.

Thus, as described above with respect to FIG. 7A, the DMA coalescing block (e.g., DMA coalescing block 634) of the compiler may determine that the first DMA save instruction and the second DMA save instruction may be coalesced, and may replace the first DMA save instruction and the second DMA save instruction with a coalesced DMA save instruction to be performed at the scheduled time of the second DMA save instruction, where the source of the coalesced DMA save instruction is at region 780 of local memory 700.

FIG. 7F illustrates another example of coalescing DMA save instructions according to certain embodiments. In the illustrated example, in the compiled instruction code, the source of a first DMA save instruction may be at a region 762 of local memory 700 and the destination of the first DMA save instruction may be at a first DRAM block. The source of a second DMA save instruction may be at a region 772 of local memory 700 and the destination of the second DMA save instruction may also be at the first DRAM block. Region 772 may not be adjacent to region 762. The DMA coalescing block of the compiler may determine that a region 790 adjacent to region 762 may not be used during and/or before the second DMA save instruction and region 762 is not used to store other data between the first DMA save instruction and the second DMA save instruction. As such, as described above with respect to FIG. 7B, the DMA coalescing block may generate and/or modify instructions to move the source of the second DMA save instruction to a region 792 adjacent to region 762 in local memory 700, for example, by changing the corresponding instruction that saves outputs to the source of the second DMA save instruction, or by moving data in region 772 to region 792 at a time before the scheduled time of the second DMA save instruction using a tensor copy instruction described above. In some embodiments, the DMA coalescing block may also modify instructions that use the source of the second DMA save instruction such that these instructions may use data in region 792 (instead of region 772). Region 792 and region 762 may form a contiguous region 782 in local memory 700. The DMA coalescing block may remove the first DMA save instruction and replace the second DMA save instruction with a coalesced DMA save instruction, the source of which is at region 782 of local memory 700. In some embodiments, instead of moving the source of the second DMA save instruction to region 792, the source of the first DMA save instruction may be moved to a region of region 790 that is adjacent to region 772.

FIG. 7G illustrates another example of coalescing DMA save instructions according to certain embodiments. In the illustrated example, the source of a first DMA save instruction may be at a region 764 of local memory 700 and the destination of the first DMA save instruction may be at a first DRAM block. The source of a second DMA save instruction may be at a region 774 of local memory 700 and the destination of the second DMA save instruction may also be at the first DRAM block. Region 774 may not be adjacent to region 764, which may be adjacent to a region 794 that may store other data at and/or before the time of the second DMA save instruction. The DMA coalescing block of the compiler may determine that region 764 is not used to store other data between the first DMA save instruction and the second DMA save instruction and a region 768 is not used to store other data at and/or before the time of the second DMA save instruction. Thus, as described above with respect to FIG. 7C, the DMA coalescing block may generate and/or modify instructions to move data stored in region 794 (or to be stored in region 794) to region 768, for example, by changing the instruction of the tensor operation that saves outputs to region 794 to save the outputs to region 768 instead, or by moving data in region 794 to region 768 using a tensor copy instruction described above. The DMA coalescing block may also modify subsequent instructions that originally use data stored in region 794 such that the instructions may use data stored in region 768 instead. The DMA coalescing block may also generate or modify instructions to move the source of the second DMA save instruction to a region 796 adjacent to region 764 in local memory 700, for example, by changing the instruction of the corresponding tensor operation that saves outputs to the source of the second DMA save instruction, or by moving data in region 774 to region 796 using a tensor copy instruction described above. In some embodiments, the DMA coalescing block may also modify instructions that use the source of the second DMA save instruction such that these instructions may use data in region 796 (instead of region 774). Region 796 and region 764 may form a contiguous region 784 in local memory 700. The DMA coalescing block may delete the first DMA save instruction and replace the second DMA save instruction with a coalesced DMA save instruction, the source of which is at region 784 of local memory 700. In some embodiments, instead of moving the source of the second DMA save instruction to region 796, the source of the first DMA save instruction may be moved to a region of region 794 that is adjacent to region 774.

FIG. 7H illustrates yet another example of coalescing DMA save instructions according to certain embodiments. In the illustrated example, in the compiled instruction code, the source of a first DMA save instruction may be at a region 766 of local memory 700 and the destination of the first DMA save instruction may be at a first DRAM block. The source of a second DMA save instruction may be at a region 776 of local memory 700 and the destination of the second DMA save instruction may also be at the first DRAM block. Region 776 may not be adjacent to region 766. The region between region 766 and region 776 may be smaller than region 776 and region 766 and/or may be used by another operation during and/or before the second DMA save instruction. The DMA coalescing block of the compiler may determine that a region 778 may be used to store the source of the first DMA save instruction between the first DMA save instruction and the second DMA save instruction and may be large enough to also store the source of the second DMA save instruction. Thus, as described above with respect to FIG. 7D, the DMA coalescing block may generate and/or modify instructions to directly write or move the source of the first DMA save instruction to a region 788 in region 778, for example, by changing the instruction of a corresponding tensor operation to save outputs of the tensor operation to region 788, or by moving data in region 766 to region 788 using a tensor copy instruction described above. The DMA coalescing block may also generate or modify instructions to directly write or move the source of the second DMA save instruction to a region 798 in region 778, for example, by changing the instruction of a corresponding tensor operation to save outputs of the tensor operation to region 798, or by moving data in region 776 to region 798 using a tensor copy instruction described above. In some embodiments, the DMA coalescing block may modify instructions that use the source of the first DMA save instruction such that these instructions may use data in region 788 (instead of region 766). In some embodiments, the DMA coalescing block may modify instructions that use the source of the second DMA save instruction such that these instructions may use data in region 798 (instead of region 776). Region 788 and region 798 may form a contiguous region 786 in local memory 700. The DMA coalescing block may delete the first DMA save instruction and replace the second DMA save instruction with a coalesced DMA save instruction, the source of which is at region 786 of local memory 700.

Described above are some examples of coalescing DMA save instructions. There may be many other circumstances where a group of DMA save instructions may be coalesced and there may be many other ways of arranging the sources of a group of DMA save instructions into a contiguous block in the local memory and delaying the DMA save instructions without interfering with other operations, such that the group of DMA save instructions may be coalesced into a single DMA save instruction, where the source of the single DMA save instruction is the contiguous block in the local memory.

In some embodiments, DMA save instructions that write to different DRAM blocks may also be coalesced, for example, if the DMA save instructions have the same data type or transfer type, and the sources of the DMA save instructions have the same partition number(s) or the tensors to be saved are split from a same large tensor.

Similarly, a group of DMA load instructions that load data (e.g., input tensors and/or constant tensors such as weights) from a same DRAM block to the local memory may also be coalesced by arranging the destinations of the group of DMA load instructions into a contiguous local memory block and loading the data into the contiguous local memory block in one DMA load instruction, if the early loading of some data into the contiguous local memory block would not interfere with the local memory usage by other instructions. The destinations of the group of DMA load instructions may be arranged into a contiguous block by, for example, moving data within the local memory using the tensor copy instructions or by changing tensor operation instructions that write to the local memory as described above. In some embodiments, the data loaded into the local memory using the single DMA load instruction may be moved to new locations that are available in local memory using the tensor copy instructions. Instructions that use data in the destinations of the group of load instructions may be changed accordingly to use data in the contiguous block or data in the new locations. In some embodiments, the data to be reloaded into the local memory using the group of DMA load instructions may be data saved to a same DRAM block using a coalesced DMA save instruction described above.

Figures 8A, 8B, 8C, 8D:
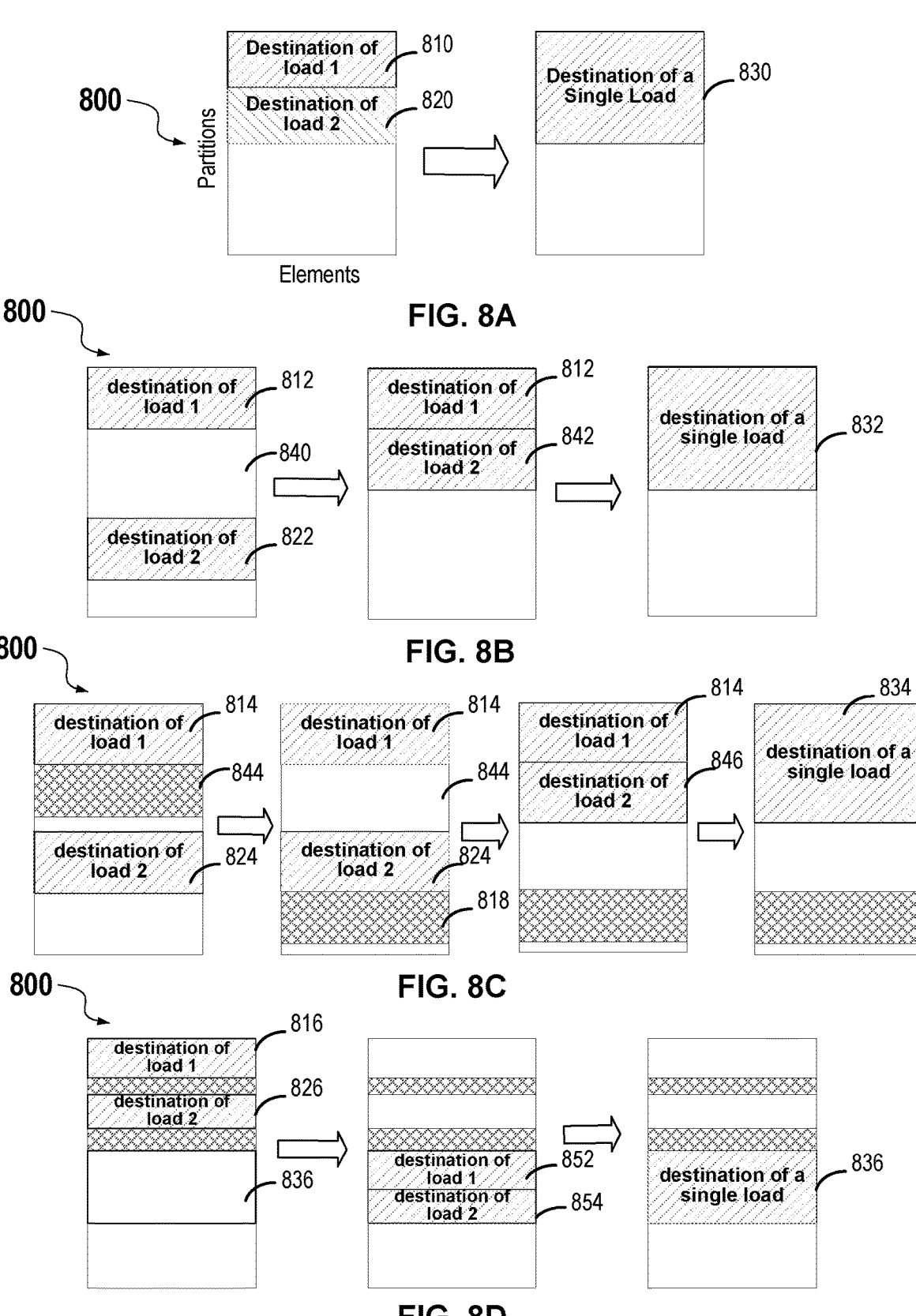
FIGS. 8A-8D illustrate examples of coalescing DMA load instructions according to certain embodiments.

FIG. 8A illustrates an example of coalescing DMA load instructions according to certain embodiments. FIG. 8A shows a local memory 800, such as memory subsystem 304 of accelerator 302 or state buffer 504-1 of accelerator 502-1. Local memory 800 may include multiple partitions (e.g., 128 partitions), where each partition may include a plurality of elements, such as about 256 KB. The destination of a first DMA load instruction in the compiled instruction code (e.g., after GCA 632) may be at a region 810 of local memory 800 and the source of the first DMA load instruction may be at a first DRAM block. The destination of a second DMA load instruction may be at a region 820 of local memory 800, and the source of the second DMA load instruction may also be at the first DRAM block. Region 820 may be adjacent to region 810. In some embodiments, the data to be transferred by the first DMA load instruction may be an input tensor of a first tensor operation. In some embodiments, the data to be transferred by the second DMA load instruction may be an input tensor of a second tensor operation. In some embodiments, the input tensor of the first tensor operation and the input tensor of the second tensor operation may be different tiles of a same large tensor, and the first tensor operation and the second tensor operation may be split from a large tensor operation. In some embodiments, the data to be transferred by the first DMA load instruction and the data to be transferred by the second DMA load instruction may be saved to the first DRAM block, for example, from the local memory by executing a group of DMA save instructions or a coalesced DMA save instruction described above.

In the example shown in FIG. 8A, the DMA coalescing block (e.g., DMA coalescing block 634) of the compiler may analyze the compiled instruction code that includes the first DMA load instruction and the second DMA load instruction, and may determine that the first DMA load instruction and the second DMA load instruction load data from a same DRAM block to a same local memory block (e.g., memory bank 314) and that region 810 and region 820 are in adjacent regions of local memory 800 and form a contiguous region 830. In addition, the DMA coalescing block of the compiler may determine that region 820 is not used to store other data between the first DMA load instruction and the second DMA load instruction. Thus, performing the second DMA load instruction at the scheduled time of the first DMA load instruction may not interfere with other operations. As such, the DMA coalescing block may delete the second DMA load instruction and replace the first DMA load instruction with a coalesced DMA load instruction, the destination of which is at region 830 of local memory 800. Even though only two DMA load instructions are shown as coalesced in the illustrated example, a group of DMA load instructions including two or more DMA load instructions may be coalesced if the group of DMA load instructions load data from a same DRAM block to the local memory, the destinations of the group of DMA load instructions are in adjacent regions of the local memory, and executing the group of DMA load instructions at the time of the first DMA load instruction in the group would not interfere with other operations.

FIG. 8B illustrates another example of coalescing DMA load instructions according to certain embodiments. In the example shown in FIG. 8B, the destination of a first DMA load instruction may be at a region 812 of local memory 800 and the source of the first DMA load instruction may be a first DRAM block. The destination of a second DMA load instruction may be at a region 822 of local memory 800 and the source of the second DMA load instruction may also be at the first DRAM block. Region 822 may not be adjacent to region 812. In some embodiments, the data to be transferred by the first DMA load instruction may be an input tensor of a first tensor operation. In some embodiments, the data to be transferred by the second DMA load instruction may be an input tensor of a second tensor operation. In some embodiments, the input tensor of the first tensor operation and the input tensor of the second tensor operation may be different tiles of a same large tensor, and the first tensor operation and the second tensor operation may be split from a large tensor operation. In some embodiments, the data to be transferred by the first DMA load instruction and the data to be transferred by the second DMA load instruction may be saved to the first DRAM block, for example, from the local memory by executing a group of DMA save instructions or a coalesced DMA save instruction described above.

In the example illustrated in FIG. 8B, the DMA coalescing block (e.g., DMA coalescing block 634) of the compiler may analyze the compiled instruction code that includes the first DMA load instruction and the second DMA load instruction, and may determine that the first DMA load instruction and the second DMA load instruction load data from a same DRAM block to the local memory. The DMA coalescing block may also determine that region 812 and region 822 are not in adjacent regions of local memory 800, but a region 840 after region 812 may not be used between the first DMA load operation and the second DMA load instruction. Thus, executing the second DMA load instruction to load data into region 840 at the scheduled time of the first DMA load instruction may not interfere with other operations. As such, the DMA coalescing block may delete the second DMA load instruction and replace the first DMA load instruction with a coalesced DMA load instruction, the destination of which is at region 832 of local memory 800. The DMA coalescing block may also change instructions that use the data loaded by the second DMA load instruction, or may insert a tensor copy instruction to move data loaded into region 842 to region 822. In some implementations, instead of moving the destination of the second DMA load instruction to region 842, the destination of the first DMA load instruction may be moved to a region of region 840 that is adjacent to region 822. Even though only two DMA load instructions are shown as coalesced in the illustrated example, a group of DMA load instructions including two or more DMA load instructions may be coalesced if the group of DMA load instructions load data from a same DRAM block to the local memory (e.g., to a same local memory bank), the destinations of the group of DMA load instructions can be arranged into adjacent regions of the local memory without violating other memory constraints, and executing the group of DMA load instructions to load data into region 832 at the scheduled time of the first DMA load instruction in the group would not interfere with other operations.

FIG. 8C illustrates another example of coalescing DMA load instructions according to certain embodiments. In the example shown in FIG. 8C, the destination of a first DMA load instruction may be at a region 814 of local memory 800 and the source of the first DMA load instruction may be at a first DRAM block. The destination of a second DMA load instruction may be at a region 824 of local memory 800 and the source of the second DMA load instruction may also be at the first DRAM block. Region 824 may not be adjacent to region 814, which may be adjacent to a region 844 that may be allocated to store other data at and/or after the time of the first DMA load instruction. In some embodiments, the data to be transferred by the first DMA load instruction may be an input tensor of a first tensor operation. In some embodiments, the data to be transferred by the second DMA load instruction may be an input tensor of a second tensor operation. In some embodiments, the input tensor of the first tensor operation and the input tensor of the second tensor operation may be different tiles of a same large tensor, and the first tensor operation and the second tensor operation may be split from a large tensor operation. In some embodiments, the data to be transferred by the first DMA load instruction and the data to be transferred by the second DMA load instruction may be saved to the first DRAM block, for example, from the local memory by executing a group of DMA save instructions or a coalesced DMA save instruction described above.

In the example illustrated in FIG. 8C, the DMA coalescing block of the compiler may analyze the compiled instruction code that includes the first DMA load instruction and the second DMA load instruction, and may determine that the first DMA load instruction and the second DMA load instruction load data from a same DRAM block to the local memory. The DMA coalescing block may also determine that region 814 and region 824 are not in adjacent regions of local memory 800, and a region 844 adjacent to region 814 may be allocated to store data used by another operation during and/or after the first DMA load instruction. In addition, the DMA coalescing block of the compiler may determine that a region 818 (or region 824) is not used to store data used by other instruction between the first DMA load instruction and the second DMA load instruction. The DMA coalescing block may generate or modify instructions to move data stored in region 844 (or to be stored in region 844) to region 818 (or region 824), for example, by changing the instruction of the tensor operation that saves outputs to region 844 such that the tensor operation saves the outputs to region 818 (or region 824) instead, or by moving data in region 844 to region 818 (or region 824) using a tensor copy instruction described above. The DMA coalescing block may also modify subsequent instructions that originally use data stored in region 844 such that the instructions may instead use data stored in region 818 (or region 824). The destination of the second DMA load instruction may be changed to a region 846 adjacent to region 814 in local memory 800, where region 814 and region 846 may form a contiguous block in region 834. The DMA coalescing block may delete the second DMA load instruction and replace the first DMA load instruction with a coalesced DMA load instruction, the destination of which is at region 834 of local memory 800. The DMA coalescing block may also change instructions that use the data loaded by the second DMA load instruction, or may insert a tensor copy instruction to move data loaded into region 846 to region 824. In some implementations, instead of moving the destination of the second DMA load instruction to region 846, the destination of the first DMA load instruction may be moved to a region of region 844 that is adjacent to region 824. Even though only two DMA load instructions are shown as coalesced in the example, a group of DMA load instructions including two or more DMA load instructions may be coalesced if the group of DMA load instructions load data from a same DRAM block to the local memory (e.g., to a same local memory bank), the destinations of the group of DMA load instructions can be arranged into adjacent regions of the local memory (e.g., by moving data within the local memory using tensor copy instructions), and executing the group of DMA load instructions to load data into region 834 at the scheduled time of the first DMA load instruction in the group would not interfere with other operations.

FIG. 8D illustrates another example of coalescing DMA load instructions according to certain embodiments. In the example shown in FIG. 8D, the destination of a first DMA load instruction may be at a region 816 of local memory 800 and the source of the first DMA load instruction may be a first DRAM block. The destination of a second DMA load instruction may be at a region 826 of local memory 800 and the source of the second DMA load instruction may also be at the first DRAM block. Region 826 may not be adjacent to region 816, and the region between region 826 and region 816 may be smaller than region 816 and region 826 or may be allocated to store other data at and/or after the time of the first DMA load instruction. In some embodiments, the data to be transferred by the first DMA load instruction may be an input tensor of a first tensor operation. In some embodiments, the data to be transferred by the second DMA load instruction may be an input tensor of a second tensor operation. In some embodiments, the input tensor of the first tensor operation and the input tensor of the second tensor operation may be different tiles of a same large tensor, and the first tensor operation and the second tensor operation may be split from a large tensor operation. In some embodiments, the data to be transferred by the first DMA load instruction and the data to be transferred by the second DMA load instruction may be saved to the first DRAM block, for example, from the local memory by executing a group of DMA save instructions or a coalesced DMA save instruction described above.

In the example illustrated in FIG. 8D, the DMA coalescing block of the compiler may analyze the compiled instruction code that includes the first DMA load instruction and the second DMA load instruction, and may determine that the first DMA load instruction and the second DMA load instruction load data from a same DRAM block to the local memory. The DMA coalescing block may also determine that region 816 and region 826 are not in adjacent regions of local memory 800, and the region between region 816 and region 826 may be smaller than region 816 and region 826 and/or may be used by another operation during and/or after the first DMA load instruction. In addition, the DMA coalescing block of the compiler may determine that a region 836 that is equal to larger than the total size of region 816 and region 826 may be used as the destination of the first DMA load instruction (e.g., at a region 852) and the destination of the second DMA load instruction (at a region 854) at or after the scheduled time of the first DMA load instruction. Thus, executing the second DMA load instruction to load data into region 836 at the scheduled time of the first DMA load instruction may not interfere with other operations. The DMA coalescing block may delete the second DMA load instruction and replace the first DMA load instruction with a coalesced DMA load instruction, the destination of which is at region 836 of local memory 800. The DMA coalescing block may also change instructions that use data to be loaded by the first DMA load instruction and the second DMA load instruction, or may insert a tensor copy instruction to move data loaded into region 852 to region 816 and a tensor copy instruction to move data loaded into region 854 to region 826. Even though only two DMA load instructions are shown as coalesced in the example, a group of DMA load instructions including two or more DMA load instructions may be coalesced if the group of DMA load instructions load data from a same DRAM block to the local memory, the destinations of the group of DMA load instructions can be arranged in adjacent regions (e.g., in region 836) of the local memory, and executing the group of DMA load instructions to load data into the adjacent regions at the scheduled time of the first DMA load instruction in the group would not interfere with other operations.

Described above are some examples of coalescing DMA load instructions. There may be many other circumstances where a group of DMA load instructions may be coalesced and there may be many other ways of arranging the destinations of a group of DMA load instructions into a contiguous block in the local memory and moving the DMA load instructions ahead without interfering with other operations, such that the group of DMA load instructions may be coalesced into a single DMA load instruction, where the destination of the single DMA load instruction is the contiguous block in the local memory. For example, the destinations of different DMA load instructions in the group of DMA load instructions may be arranged into different partitions and/or different elements of the same partitions in a contiguous local memory block.

FIG. 9 includes a flowchart 900 illustrating an example of a process of coalescing DMA instructions according to certain embodiments. Operations described in flowchart 900 may be performed by, for example, a compiler running on a host system, such as the compiler and host system described above with respect to FIG. 4 and FIG. 6. Although flowchart 900 may describe the operations as a sequential process, in various embodiments, many of the operations may be performed in parallel or concurrently. In addition, the order of the operations may be rearranged. The process may have additional operations not shown in the figure. Each block in flowchart 900 may include one or more operations. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium or may be carried by a data carrying signal.

At block 910, a computing system implementing a neural network compiler may compile a neural network model to generate instruction code for implementing the neural network model using a computing device, such as the integrated circuit device of FIG. 3 or computing system 500. The neural network model may include, for example, a CNN, such as a ResNet, or other neural network models, and may be described using, for example, a high-level programming language, such as Java, C++, MATLAB, Python, Tensorflow, or a computation graph, among many other examples. The neural network model may include a single batch model, or a batch-N model (N>1). As described above with respect to, for example, FIGS. 4 and 6, the computing system may implement the neural network compiler in multiple stages or phases. For example, the instruction code may be generated by front end 610, middle end 620, and back end 630 (except DMA coalescing block 634).

A local memory (e.g., a state buffer 504-1) of an accelerator (e.g., accelerator 502-1) of the computing device may have a finite size, such as about a few megabytes or tens of megabytes (e.g., 128 partitions×256 KB/partition), and thus may not be able to store all data used by the neural network. Therefore, the generated instruction code may include a plurality of DMA instructions for data transferring between the local memory of the accelerator and a system memory (e.g., system memory 520) of the computing device. The data transferred between the local memory and the system memory may include, for example, input tensors to be processed, static variables such as weights of the neural network (e.g., filters of a CNN), and output tensors generated using the input tensors and the static variables. For example, static variables may be loaded into the local memory, used by one or more computation operations, evicted from the local memory after the one or more computation operations, and reloaded to the local memory for other computation operations in later stages or subsequent layers. Output tensors of some tensor operations may be used as the input tensors for some other tensor operations (e.g., on the subsequent layers), and thus may also need to be saved in the system memory and then reloaded into the system memory when needed. The instruction code may also include computation instructions, such as convolution operations (e.g., matrix multiplications), activation operations, pooling operations, residue add operations, and the like, as described above. The computation instructions may use the input tensors and the static variables loaded into the local memory, and may save intermediate output tensors to the local memory.

At block 915, the computing system may optionally analyze the instruction code to identify a contiguous block in the local memory for storing data to be transferred in a group of DMA instructions of the plurality of DMA instructions. For example, the computing system may identify, from the plurality of DMA instructions, a group of DMA save instructions that write to a same block in the system memory, and may determine, based on the instruction code, a contiguous block in the local memory for storing data to be transferred in the group of DMA save instructions. The contiguous block may be a contiguous 2-dimensional block that includes adjacent elements in one or more adjacent partitions of the local memory. In some embodiments, sources of the group of DMA save instructions may have a same data type, source addresses of the group of DMA save instructions may have a same partition number in the local memory, and/or data to be transferred by the group of DMA save instructions may be portions of a same tensor. In some embodiments, the computing system may identify, based on the instruction code, a second contiguous block in the local memory for storing data to be transferred in a group of DMA load instructions of the plurality of DMA instructions. In some embodiments, the group of DMA load instructions may write to a same bank of the local memory.

At block 920, the computing system may modify the instruction code to arrange sources or destinations of the group of DMA instructions into the contiguous block in the local memory. In some embodiments, modifying the instruction code may include adding, before the single DMA instruction, a tensor copy instruction to move data from a region of the contiguous block of the local memory to a region of the local memory outside the contiguous block. The tensor copy instruction may be performed by a processing engine of the accelerator, where the processing engine may be connected to the local memory of the accelerator through a dedicated bus interface. In one example, the processing engine includes a pooling engine of the accelerator. In some embodiments, the dedicated bus interface may be configured to read from or write to each partition of the local memory in parallel. For example, the dedicated bus interface may write to each partition of the local memory at a speed of 8 bytes per four clock cycles.

In some embodiments, the group of DMA instructions may include a group of DMA save instructions that save data to a same block in the system memory, and modifying the instruction code may include changing an output address of a tensor operation instruction of the instruction code to a region in the contiguous block of the local memory, where a source of a DMA save instruction of the group of DMA save instructions may be an output of the tensor operation instruction. In some embodiments, the group of DMA instructions may include a group of DMA save instructions that save data to a same block in the system memory, and modifying the instruction code may include adding a tensor copy instruction to move data in a source of a DMA save instruction of the group of DMA save instructions to a region in the contiguous block of the local memory.

At block 925, the computing system implementing the compiler may optionally modify the instruction code to change an instruction that uses a source or a destination of a DMA instruction that has been changed in block 920. For example, in some embodiments, the group of DMA instructions may include a group of DMA load instructions, and the computer-implemented method may also include modifying an instruction in the instruction code that uses data to be loaded into a region outside of the contiguous block of the local memory using a DMA load instruction of the group of DMA load instructions, such that the modified instruction uses data loaded into the contiguous block of the local memory. In some embodiments, the group of DMA instructions may include a group of DMA load instructions, and the computer-implemented method may also include adding, after the single DMA instruction, a tensor copy instruction to move data from a region of the contiguous block of the local memory to a region of the local memory outside of the contiguous block, the region of the local memory outside of the contiguous block being a destination of a DMA load instruction of the group of DMA load instructions. In some embodiments, operations are block 925 may be performed after the operations at block 930.

At block 930, the computing system may replace the group of DMA instructions with a single DMA instruction, where the source or destination of the single DMA instruction is the contiguous block of the local memory. In some embodiments, the contiguous block of the local memory may include equal to or greater than 2 K bytes in a partition of the local memory. In embodiments where the group of DMA instructions includes a group of DMA save instructions, the single DMA instruction may be a single DMA save instruction scheduled to be performed at the originally scheduled time of the last DMA save instruction of the group of DMA save instructions. In embodiments where the group of DMA instructions includes a group of DMA load instructions, the single DMA instruction may be a single DMA load instruction scheduled to be performed at the originally scheduled time of the first DMA load instruction of the group of DMA load instructions.

Figure 10:
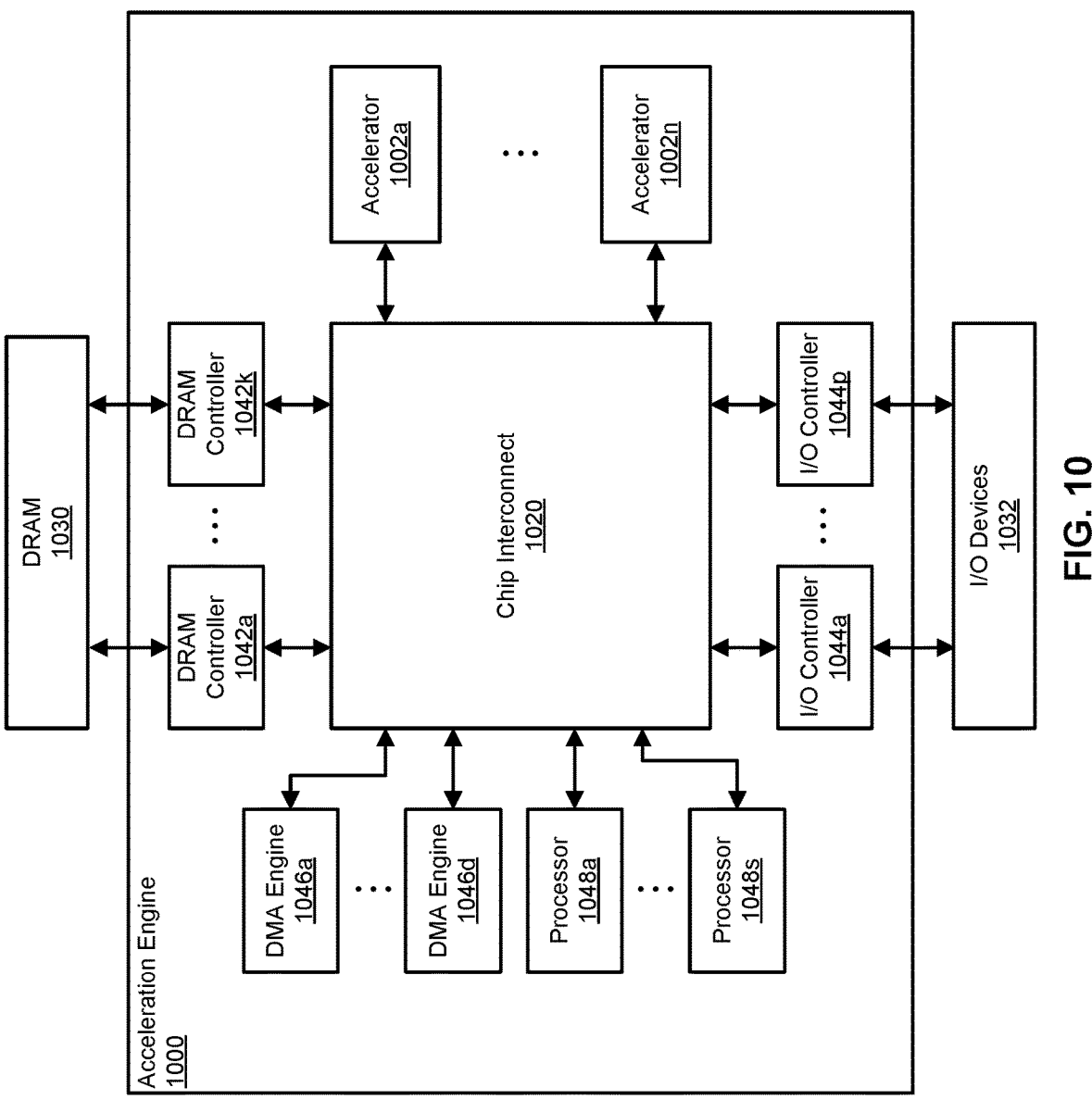
FIG. 10 includes a block diagram of an example of an acceleration engine.

FIG. 10 includes a block diagram that illustrates an example of an acceleration engine 1000. The acceleration engine 1000 is an example of an integrated circuit that can include one or more accelerators 1002a-1002n that may be similar to the accelerator illustrated in FIG. 3.

In the example of FIG. 10, the acceleration engine 1000 includes multiple accelerators 1002a-1002n, each of which can perform a set of operations. In various examples, the accelerators 1002a-1002n are for particular types of operations, so that the accelerators 1002a-1002n can perform the operations much faster than when similar operations are performed by a general purpose processor. In various examples, to perform a set of operations, input data on which the operations are to be performed must first be moved into the accelerators 1002a-1002n. Additionally, in some cases, program code is also moved into the accelerators 1002a-1002n, which programs the operations that the accelerators 1002a-1002n will perform on the data. In the illustrated example, the acceleration engine 1000 includes n accelerators 1002a-1002n. Examples of accelerators that can be included in the acceleration engine 1000 include graphics accelerators, floating point accelerators, neural network accelerators, and others. In various examples, the accelerators 1002a-1002n can each be the same (e.g., each of the accelerators 1002a-1002n is a graphics accelerator) or can be different (e.g., the accelerators 1002a-1002n include a graphics accelerator, a floating point accelerator, and neural network accelerator).

The example acceleration engine 1000 further includes DRAM controllers 1042a-1042k for communicating with an external memory. The external memory is implemented, in this example, using DRAM 1030. In the illustrated example, the acceleration engine 1000 includes k DRAM controllers 1042a-1042k, each of which may be able to communicate with an independent set of banks of DRAM. In other examples, other types of RAM technology can be used for the external memory. The DRAM controllers 1042a-1042k can also be referred to as memory controllers.

In various examples, input data and/or program code for the accelerators 1002a-1002n can be stored in the DRAM 1030. Different programs can cause the accelerators 1002a-

1002n to perform different operations. For example, when one of the accelerators is a neural network accelerator, one program can configure the neural network accelerator to perform speech recognition while another program can configure the neural network accelerator to perform image recognition. In various examples, different accelerators 1002a-1002n can be programmed with different programs, so that each performs a different set of operations. In various examples, the processors 1048a-1048s can manage moving of program code from the DRAM 1030 to the accelerators 1002a-1002n.

The example acceleration engine 1000 further includes I/O controllers 1044a-1044p for communicating with I/O devices 1032 in the system. The acceleration engine 1000 can communicate with I/O devices over, for example, a processor bus. In some examples, the processor bus can be implemented using Peripheral Component Interconnect (PCI) and/or a variation of the PCI bus protocol. The processor bus can connect the acceleration engine 1000 to I/O devices such as, for example, input and output devices, memory controllers, storage devices, and/or network interface cards, among other things. In some examples, the I/O controllers 1044-1044p can enable the acceleration engine 1000 to act as an I/O device for a host processor. For example, the acceleration engine 1000 can be the recipient of input data from the host processor, and a command indicating an operation to be performed on the input data (e.g., a particular computation or analysis). In the illustrated example, the acceleration engine 1000 includes p I/O controllers 1044a-1044p, each of which may include a separate root complex and may communicate with a separate set of I/O devices 1032. In other examples, other standardized bus protocols, such as Ultra Path Interconnect (UPI) can be used for the host bus. In other examples, a proprietary bus protocol can be used.

Movement of data in the acceleration engine 1000 can be managed by one or more processors 1048a-1048s, which can also be referred to as data management processors. In the example of FIG. 10, the acceleration engine 1000 includes s processors 1048a-1048s incorporated into the device (e.g., on the same silicon die). In other examples, the processors 1048a-1048s can be external to the acceleration engine 1000 (e.g., on a different die and/or in a different package). In some examples, the processors 1048a-1048s can manage the movement of data from I/O devices 1032 to the accelerators 1002a-1002n or the DRAM 1030. For example, input data may be located at an I/O device 1032 or in processor memory, and the processors 1048a-1048s can move the input from the I/O device 1032 or processor memory into an accelerator or into DRAM 1030. As another example, program code for the accelerators 1002a-1002n may be located on an I/O device 1032 or in processor memory.

The example acceleration engine 1000 further includes DMA engines 1046a-1046d that can move data between the accelerators 1002a-1002n, DRAM controllers 1042a-1042k, and I/O controllers 1044a-1044p. In the illustrated example, the acceleration engine 1000 includes d DMA engines 1046a-1046d. In some implementations, the DMA engines 1046a-1046d can be assigned to specific tasks, such as moving data from the DRAM controllers 1042a-1042d to the accelerators 1002a-1002n, or moving data between the I/O controllers 1044a-1044p and the accelerators 1002a-1002n. These tasks can be assigned, for example, by enqueueing descriptors with the DMA engines 1046a-1046d, where a descriptor identifies an address for a block of data and an operation (e.g., a read or a write) to perform.

A descriptor, for example, can direct a DMA engine to instruct a DMA controller to read a block of data from DRAM 1030. A descriptor can, as a further example, instruct the DMA engine to write data, read by the DMA controller, to an accelerator. Further descriptors can be used to move data from an accelerator to DRAM 1030.

In various examples, each of the processors 1048a-1048s can be responsible for managing the data movement for a different accelerator. In some examples, a processor may manage the data movement for more than one accelerator. Similarly, in various examples, each of the processors 1048a-1048s can be assigned to one or more DMA engines 1046a-1046d. In these and other examples, associations between processors 1048a-1048s, accelerators 1002a-1002n, and DMA engines 1046a-1046d are determined by program code being executed by each respective processor.

In the example acceleration engine 1000, the various components can communicate over a chip interconnect 1020. The chip interconnect 1020 primarily includes wiring for routing data between the components of the acceleration engine 1000. In some cases, the chip interconnect 1020 can include a minimal amount of logic, such as multiplexors to control the direction of data, flip-flops for handling clock domain crossings, and timing logic.

Figure 11:
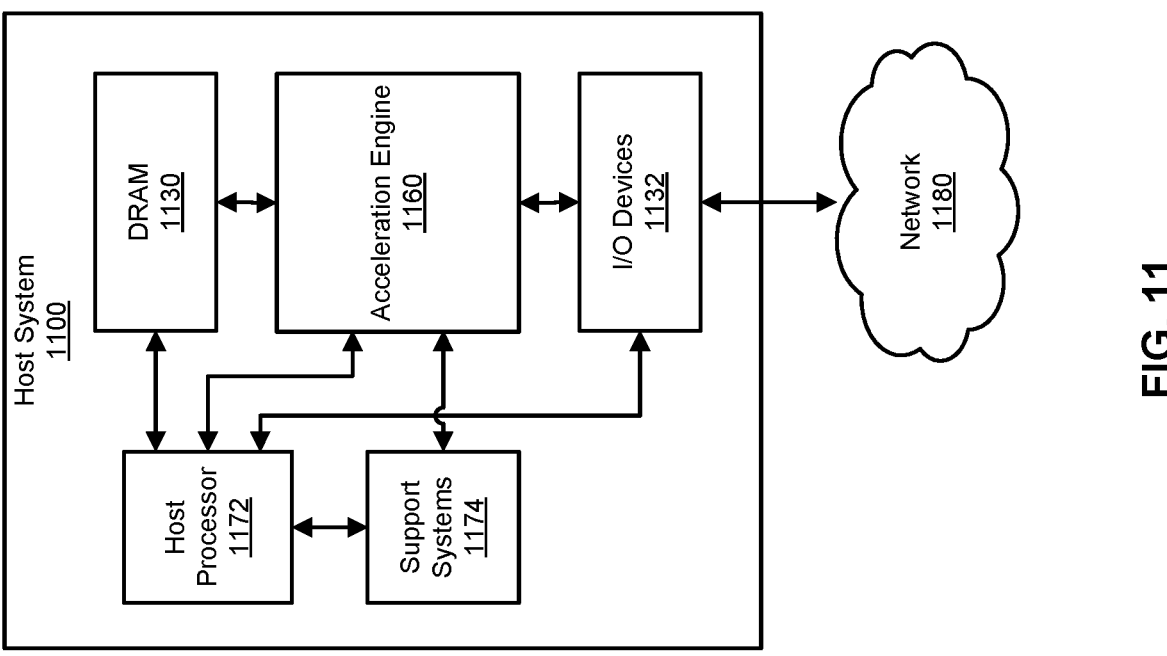
FIG. 11 includes a block diagram of an example of a host system.

FIG. 11 includes a block diagram that illustrates an example of a host system 1100 in which an acceleration engine 1160 can be used. The acceleration engine 1160 of FIG. 11 is an example of a device that can include one or more accelerators such as is illustrated in FIG. 10. The example host system 1100 of FIG. 11 includes the acceleration engine 1160, a host processor 1172, DRAM 1130 or processor memory, I/O devices 1132, and support systems 1174. In various implementations, the host system 1100 can include other hardware that is not illustrated here.

The host processor 1172 is a general purpose integrated circuit that is capable of executing program instructions. In some examples, the host processor 1172 can include multiple processing cores. A multi-core processor may include multiple processing units within the same processor. In some examples, the host system 1100 can include more than one host processor 1172. In some examples, the host processor 1172 and the acceleration engine 1160 can be one chip, such as, one or more integrated circuits within the same package.

In various examples, the host processor 1172 can communicate with other components in the host system 1100 over one or more communication channels. For example, the host system 1100 can include a host processor bus, which the host processor 1172 can use to communicate with the DRAM 1130, for example. As another example, the host system 1100 can include an I/O bus, such as a PCI-based bus, over which the host processor 1172 can communicate with the acceleration engine 1160 and/or the I/O devices 1132, for example. In various examples, the host system 1100 can, alternatively or additionally, include other communication channels or busses, such as serial busses, power management busses, storage device busses, and so on.

In some examples, software programs executing on the host processor 1172 can receive or generate input for processing by the acceleration engine 1160. In some examples, the programs can select an appropriate neural network to execute for a given input. For example, a program may be for language translation, and can select one or more neural networks capable of speech recognition and/or machine translation. In these and other examples, the programs can configure the acceleration engine 1160 with the neural network to execute, and/or can select a neural network processing engine on the acceleration engine 1160 that has previously been configured to execute the desired neural network. In some examples, once the acceleration engine 1160 has started an inference on input data, the host processor 1172 can manage the movement of data (such as weights, instructions, intermediate results, results of conditional layers, and/or final results) into or out of the acceleration engine 1160.

In some examples, a software program that is using the acceleration engine 1160 to conduct an inference can read the result from a conditional layer from the acceleration engine 1160 and/or from a storage location, such as in DRAM 1130. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1130 is memory that is used by the host processor 1172 for storage of program code that the host processor 1172 is in the process of executing, as well as values that are being operated on. In some examples, the data for a neural network (e.g., weight values, instructions, and other data) can be all or partially stored in the DRAM 1130. DRAM is a common term for processor memory, and though DRAM is volatile memory, processor memory can be volatile and/or non-volatile. Though not illustrated here, the host system 1100 can include other volatile and non-volatile memories for other purposes. For example, the host system 1100 can include a Read-Only Memory (ROM) that stores boot code for booting the host system 1100 at power on, and/or Basic Input/Output System (BIOS) code.

Though not illustrated here, the DRAM 1130 can store instructions for various programs, which can be loaded into and be executed by the host processor 1172. For example, the DRAM 1130 can be storing instructions for an operating system, one or more data stores, one or more application programs, one or more drivers, and/or services for implementing the features disclosed herein.

The operating system can manage and orchestrate the overall operation of the host system 1100, such as scheduling tasks, executing applications, and/or controller peripheral devices, among other operations. In some examples, a host system 1100 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1100. For example, some drivers can provide communication between the operating system and peripheral devices or I/O devices 1132. Alternatively or additionally, some drivers may provide communication between application programs and the operating system, and/or application programs and peripheral devices accessible to the host system 1100. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1132 can include hardware for connecting to user input and output devices, such as keyboards, mice, pens, tablets, voice input devices, touch input devices, displays or monitors, speakers, and printers, among other devices. The I/O devices 1132 can also include storage drives and/or network interfaces for connecting to a network 1180. For example, the host system 1100 can use a network interface to communicate with storage devices, user terminals, other computing devices or servers, and/or other networks, among various examples.

In various examples, one or more of the I/O devices 1132 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1100 or may be in an external enclosure. A storage device can be fixed (e.g., attached by screws) or removable (e.g., having a physical release mechanism and possibly a hot-plug mechanism).

Storage devices, the DRAM 1130, and any other memory component in the host system 1100 are examples of computer-readable storage media. Computer-readable storage media are physical mediums that are capable of storing data in a format that can be read by a device such as the host processor 1172. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1132 can be PCI-based devices. In these examples, a PCI-based I/O device includes a PCI interface for communicating with the host system 1100. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1174 can include hardware for coordinating the operations of the acceleration engine 1160. For example, the support systems 1174 can include a microprocessor that coordinates the activities of the acceleration engine 1160, including moving data around on the acceleration engine 1160. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1172. In some examples, the program executed by the microprocessor is stored on the hardware of microprocessor, or on a non-volatile memory chip in the host system 1100. In some examples, the microprocessor and the acceleration engine 1160 can be on chip, such as one integrated circuit on the same die and in the same package.

In some examples, the support systems 1174 can be responsible for taking instructions from the host processor 1172 when programs executing on the host processor 1172 request the execution of a neural network. For example, the host processor 1172 can provide the support systems 1174 with a set of input data and a task that is to be performed on the set of input data. In this example, the support systems 1174 can identify a neural network that can perform the task, and can program the acceleration engine 1160 to execute the neural network on the set of input data. In some examples, the support systems 1174 only needs to select an appropriate neural network processing engine of the neural network processor. In some examples, the support systems 1174 may need to load the data for the neural network onto the acceleration engine 1160 before the acceleration engine 1160 can start executing the neural network. In these and other examples, the support systems 1174 can further receive the output of executing the neural network, and provide the output back to the host processor 1172.

In some examples, the operations of the support systems 1174 can be handled by the host processor 1172. In these examples, the support systems 1174 may not be needed and can be omitted from the host system 1100.

In various examples, the host system 1100 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1100 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 12:
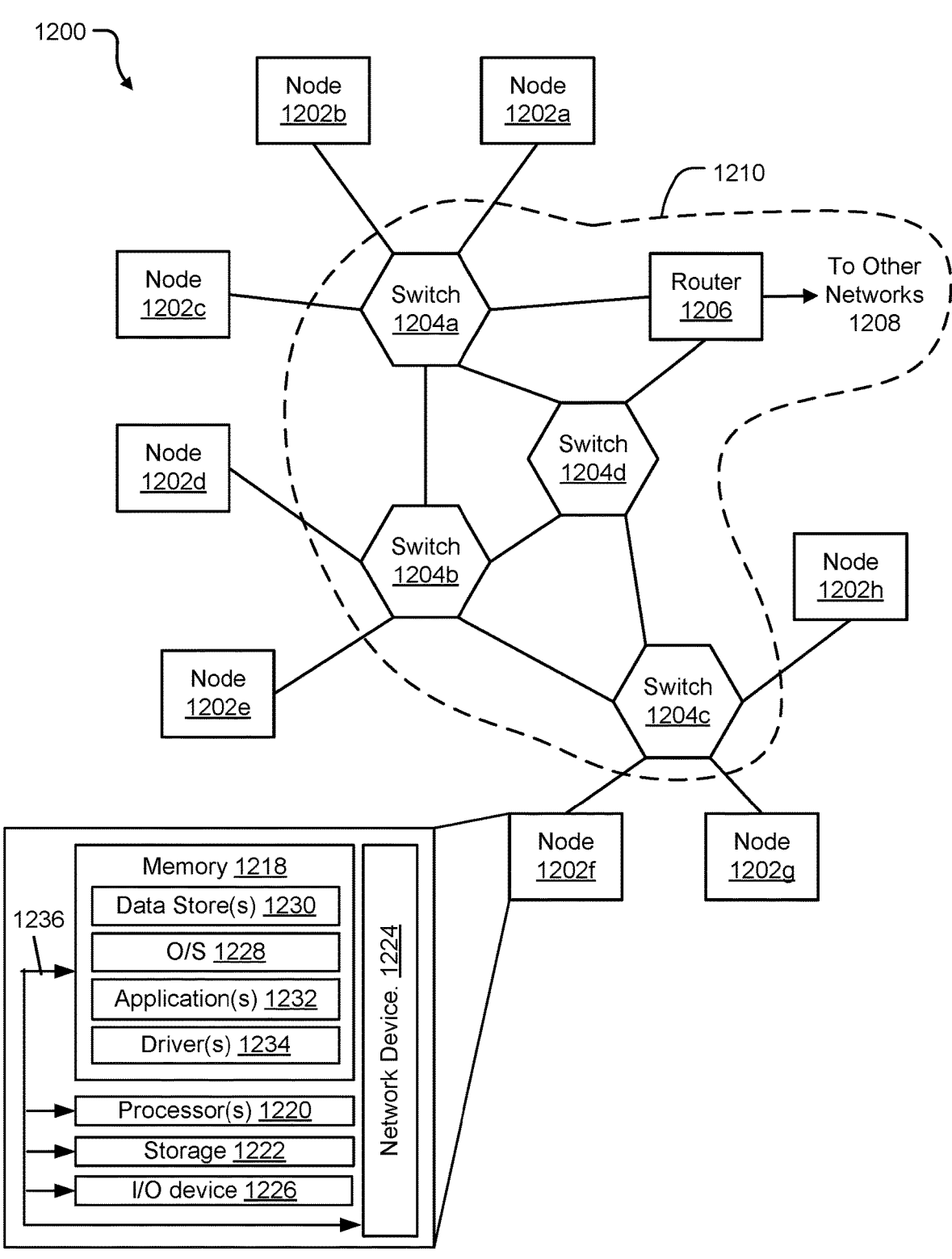
FIG. 12 includes a diagram of an example of a network.

FIG. 12 includes a diagram of an example network 1200, which can include one or more host systems, such as the host system illustrated in FIG. 11. For example, the example network 1200 of FIG. 12 includes multiple nodes 1202a-1202h, one or more of which can be a host system such as is illustrated in FIG. 11. Others of the nodes 1202a-1202h can be other computing devices, each of which include at least a memory for storing program instructions, a processor for executing the instructions, and a network interface for connecting to the network 1200.

In various examples, the network 1200 can be used to process data. For example, input data can be received at one of the nodes 1202a-1202h or from other networks 1208 with which the network 1200 can communicate. In this example, the input data can be directed to a node in the network 1200 that includes an acceleration engine, for the acceleration engine to operate on and produce a result. The result can then be transferred to the node or other network from which the input data was received. In various examples, input data can be accumulated from various sources, including one or more of the nodes 1202a-1202h and/or computing devices located in the other networks 1208, and the accumulated input data can be directed to one or more host systems in the network 1200. Results from the host systems can then be distributed back to the sources from which the input data was gathered.

In various examples, one or more of the nodes 1202a-1202h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 12, the nodes 1202a-1202h are connected to one another using a switched architecture with point-to-point links. The switched architecture includes multiple switches 1204a-1204d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1204a-1204d of FIG. 12 may be connected to the nodes 1202a-1202h and provide multiple paths between any two nodes.

The network 1200 may also include one or more network devices for connection with other networks 1208, such as a router 1206. Routers use headers and forwarding tables to determine the best path for forwarding the packets, and use protocols such as internet control message protocol (ICMP) to communicate with each other and configure the best route between any two devices. The router 1206 of FIG. 12 can be used to connect to other networks 1208 such as subnets, LANs, wide area networks (WANs), and/or the Internet.

In some examples, network 1200 may include any one or a combination of many different types of networks, such as cable networks, the Internet, wireless networks, cellular networks and other private and/or public networks. The interconnected switches 1204a-1204d and the router 1206, if present, may be referred to as a switch fabric 1210, a fabric, a network fabric, or simply a network. In the context of a computer network, terms "fabric" and "network" may be used interchangeably herein.

The nodes 1202a-1202h may be any combination of host systems, processor nodes, storage subsystems, and I/O chassis that represent user devices, service provider computers or third party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers).

The node(s) of FIG. 12 may also represent one or more service provider computers. One or more service provider computers may provide a native application that is config-ured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines imple-mented in a hosted computing environment. The hosted computing environment may include one or more rapidly provisioned and released computing resources. These com-puting resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software ser-vices. These servers may be configured as part of an inte-grated, distributed computing environment. In some aspects, the service provider computer(s) may, additionally or alter-natively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1202a-1202h may include at least one memory 1218 and one or more processing units (or processor(s) 1220). The processor(s) 1220 may be implemented in hardware, computer-execut-able instructions, firmware, or combinations thereof. Com-puter-executable instruction or firmware implementations of the processor(s) 1220 may include computer-executable or machine-executable instructions written in any suitable pro-gramming language to perform the various functions described.

In some instances, the hardware processor(s) 1220 may be a single core processor or a multi-core processor. A multi-core processor may include multiple processing units within the same processor. In some examples, the multi-core pro-cessors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the node(s) 1202a-1202h, the memory 1218 may be volatile (such as RAM) and/or non-volatile (such as ROM, flash memory, etc.). The memory 1218 may include an operating system 1228, one or more data stores 1230, one or more application programs 1232, one or more drivers 1234, and/or services for implementing the features disclosed herein.

The operating system 1228 may support nodes 1202a-1202h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1228 may also be a proprietary operating system.

The data stores 1230 may include permanent or transitory data used and/or operated on by the operating system 1228, application programs 1232, or drivers 1234. Examples of such data include web pages, video data, audio data, images, user data, and so on. The information in the data stores 1230 may, in some implementations, be provided over the net-work(s) 1208 to user devices. In some cases, the data stores 1230 may additionally or alternatively include stored appli-cation programs and/or drivers. Alternatively or addition-ally, the data stores 1230 may store standard and/or propri-etary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, network device 1224, and/or I/O device 1226. Alter-natively or additionally, some drivers 1234 may provide communication between application programs 1232 and the operating system 1228, and/or application programs 1232 and peripheral devices accessible to the service provider computer. In many cases, the drivers 1234 may include drivers that provide well-understood functionality (e.g., printer drivers, display drivers, hard disk drivers, Solid State Device drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the node(s) 1202a-1202h or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1218 and the additional storage 1222 are examples of computer storage media. Additional types of computer storage media that may be present in the node(s) 1202a-1202h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202a-1202h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202a-1202h may also include I/O device(s) 1226, such as a keyboard, a mouse, a pen, a voice input device, a touch input device, a display, speakers, a printer, and the like. The node(s) 1202a-1202h may also include one or more communication channels 1236. A communication channel 1236 may provide a medium over which the various components of the node(s) 1202a-1202h can communicate. The communication channel or channels 1236 may take the form of a bus, a ring, a switching fabric, or a network.

The node(s) 1202a-1202h may also contain network device(s) 1224 that allow the node(s) 1202a-1202h to communicate with a stored database, another computing device or server, user terminals and/or other devices on the network(s) 1200.

In some implementations, the network device 1224 is a peripheral device, such as a PCI-based device. In these implementations, the network device 1224 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1224 may be connected to a computing system using a PCIe interface.

A PCI-based device may include one or more functions. A "function" describes operations that may be provided by the network device 1224. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1224 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method comprising:
generating, based on a neural network model and configuration of a computing device, instruction code for executing by the computing device to implement the neural network model, the instruction code including a plurality of direct memory access (DMA) instructions for transferring data between a local memory of an accelerator of the computing device and a system memory of the computing device;
identifying, from the plurality of DMA instructions, a group of DMA save instructions that write to a same block in the system memory;
determining, based on the instruction code, a contiguous block in the local memory for storing data to be transferred in the group of DMA save instructions;
modifying the instruction code to place sources of the group of DMA save instructions into the contiguous block in the local memory;
removing the group of DMA save instructions and replacing the group of DMA save instructions in the instruction code implementing the neural network model with a single DMA save instruction at the last DMA save instruction of the group of DMA save instructions in the instruction code, wherein a source address of the single DMA save instruction is the contiguous block of the local memory,
identifying, based on the instruction code, a second contiguous block in the local memory for storing data to be transferred in a group of DMA load instructions of the plurality of DMA instructions;
adding a tensor copy instruction to the instruction code to move data from a region of the second contiguous block to a region of the local memory outside of the second contiguous block to make room for storing the data to be transferred in the group of DMA load instructions; and
replacing the group of DMA load instructions with a single DMA load instruction at the first DMA load instruction of the group of DMA load instructions, wherein a destination address of the single DMA load instruction is the second contiguous block of the local memory.

2. The computer-implemented method of claim 1, wherein modifying the instruction code comprises:
adding, before the single DMA save instruction, a first tensor copy instruction to move data from a region of the contiguous block to a region of the local memory outside of the contiguous block to make room for storing the data to be transferred in the group of DMA save instructions to the contiguous block;
changing an output address of a tensor operation instruction of the instruction code to a region in the contiguous block of the local memory, wherein a source of a DMA save instruction of the group of DMA save instructions is an output of the tensor operation instruction;
adding, before the single DMA save instruction, a second tensor copy instruction to move source data of a DMA save instruction of the group of DMA save instructions from a region of the local memory outside of the contiguous block to a region in the contiguous block of the local memory; or
a combination thereof.

3. The computer-implemented method of claim 2, wherein the first tensor copy instruction and the second tensor copy instruction are to be performed by a pooling engine of the accelerator, the pooling engine connected to the local memory of the accelerator through a dedicated bus interface.

4. A computer-implemented method comprising:
generating, based on a neural network model, instruction code for executing by a computing device to implement the neural network model, the instruction code including a plurality of direct memory access (DMA) instructions for transferring data between a local memory of an accelerator of the computing device and a system memory of the computing device;

modifying the instruction code to arrange sources or destinations of a group of DMA instructions of the plurality of DMA instructions into a contiguous block in the local memory; and removing the group of DMA instructions in the instruction code implementing the neural network model and replacing the group of DMA instructions with a single DMA instruction in the instruction code, wherein a source address or a destination address of the single DMA instruction is the contiguous block of the local memory, wherein the group of DMA instructions includes a group of DMA save instructions that save data to a same block in the system memory, and wherein modifying the instruction code includes:

adding a tensor copy instruction to move data in a source of a DMA save instruction of the group of DMA save instructions to a region in the contiguous block of the local memory; or changing an output address of a tensor operation instruction of the instruction code to the region in the contiguous block of the local memory, wherein the source of a DMA save instruction of the group of DMA save instructions is an output of the tensor operation instruction.

5. The computer-implemented method of claim 4, wherein modifying the instruction code includes adding, before the single DMA instruction, a tensor copy instruction to move data from a region of the contiguous block of the local memory to a region of the local memory outside the contiguous block.

6. The computer-implemented method of claim 5, wherein the tensor copy instruction is to be performed by a processing engine of the accelerator, the processing engine connected to the local memory of the accelerator through a dedicated bus interface.

7. The computer-implemented method of claim 6, wherein the processing engine includes a pooling engine of the accelerator.

8. The computer-implemented method of claim 6, wherein the dedicated bus interface is configured to read from or write to each partition of the local memory in parallel.

9. The computer-implemented method of claim 4, wherein the contiguous block of the local memory includes equal to or greater than 2 K bytes in a partition of the local memory.

10. The computer-implemented method of claim 4, further comprising:

modifying the instruction code to arrange sources or destinations of a second group of DMA instructions of the plurality of DMA instructions into a second contiguous block in the local memory, wherein the second group of DMA instructions includes a group of DMA load instructions;

removing the second group of DMA instructions in the instruction code and replacing the second group of DMA instructions with a second single DMA instruction in the instruction code, wherein a source address or a destination address of the second single DMA instruction is the second contiguous block of the local memory; and modifying an instruction in the instruction code that uses data to be loaded into a region outside of the second contiguous block of the local memory using a DMA load instruction of the group of DMA load instructions, such that the modified instruction uses data loaded into the second contiguous block of the local memory.

11. The computer-implemented method of claim 4, further comprising:

modifying the instruction code to arrange sources or destinations of a second group of DMA instructions of the plurality of DMA instructions into a second contiguous block in the local memory, wherein the second group of DMA instructions includes a group of DMA load instructions;

removing the second group of DMA instructions in the instruction code and replacing the second group of DMA instructions with a second single DMA instruction in the instruction code, wherein a source address or a destination address of the second single DMA instruction is the second contiguous block of the local memory; and adding, after the second single DMA instruction, a tensor copy instruction to move data from a region of the second contiguous block of the local memory to a second region of the local memory outside of the second contiguous block, the second region of the local memory outside of the second contiguous block being a destination of a DMA load instruction of the group of DMA load instructions.

12. A non-transitory computer readable medium having stored therein instructions that, when executed by one or more processors, cause the one or more processors to execute a compiler, the compiler performing operations including:

generating, based on a neural network model, instruction code for executing by a computing device to implement the neural network model, the instruction code including a plurality of direct memory access (DMA) instructions for transferring data between a local memory of an accelerator of the computing device and a system memory of the computing device;

modifying the instruction code to arrange sources or destinations of a group of DMA instructions of the plurality of DMA instructions into a contiguous block in the local memory; and removing the group of DMA instructions in the instruction code implementing the neural network model and replacing the group of DMA instructions with a single DMA instruction in the instruction code, wherein a source address or a destination address of the single DMA instruction is the contiguous block of the local memory, wherein the group of DMA instructions includes a group of DMA save instructions that save data to a same block in the system memory, and wherein modifying the instruction code includes:

adding a tensor copy instruction to move data in a source of a DMA save instruction of the group of DMA save instructions to a region in the contiguous block of the local memory; or changing an output address of a tensor operation instruction of the instruction code to a region in the contiguous block of the local memory, wherein a source of a DMA save instruction of the group of DMA save instructions is an output of the tensor operation instruction.

13. The non-transitory computer readable medium of claim 12, wherein modifying the instruction code includes adding, before the single DMA instruction, a tensor copy instruction to move data from a region of the contiguous block of the local memory to a region of the local memory outside the contiguous block.

14. The non-transitory computer readable medium of claim 13, wherein the tensor copy instruction is to be performed by a processing engine of the accelerator, the processing engine connected to the local memory of the accelerator through a dedicated bus interface.

15. The non-transitory computer readable medium of claim 12, wherein the operations further comprise:

modifying the instruction code to arrange sources or destinations of a second group of DMA instructions of the plurality of DMA instructions into a second contiguous block in the local memory, wherein the second group of DMA instructions includes a group of DMA load instructions;

removing the second group of DMA instructions in the instruction code and replacing the second group of DMA instructions with a second single DMA instruction in the instruction code, wherein a source address or a destination address of the second single DMA instruction is the second contiguous block of the local memory; and modifying an instruction in the instruction code that uses data to be loaded into a region outside of the second contiguous block of the local memory using a DMA load instruction of the group of DMA load instructions, such that the modified instruction uses data loaded into the second contiguous block of the local memory.

16. A computer-implemented method comprising:

generating, based on a neural network model, instruction code for executing by a computing device to implement the neural network model, the instruction code including a plurality of direct memory access (DMA) instructions for transferring data between a local memory of an accelerator of the computing device and a system memory of the computing device;

modifying the instruction code to arrange sources or destinations of a group of DMA instructions of the plurality of DMA instructions into a contiguous block in the local memory; and removing the group of DMA instructions in the instruction code implementing the neural network model and replacing the group of DMA instructions with a single DMA instruction in the instruction code, wherein a source address or a destination address of the single DMA instruction is the contiguous block of the local memory, wherein the group of DMA instructions includes a group of DMA load instructions, and wherein the computer-implemented method further comprises adding, after the single DMA instruction, a tensor copy instruction to move data from a region of the contiguous block of the local memory to a region of the local memory outside of the contiguous block, the region of the local memory outside of the contiguous block being a destination of a DMA load instruction of the group of DMA load instructions.

17. The computer-implemented method of claim 16, further comprising:

modifying the instruction code to arrange sources or destinations of a second group of DMA instructions of the plurality of DMA instructions into a second contiguous block in the local memory, the second group of DMA instructions including a second group of DMA load instructions;

removing the second group of DMA instructions in the instruction code and replacing the second group of DMA instructions with a second single DMA instruction in the instruction code, wherein a source address or a destination address of the second single DMA instruction is the second contiguous block of the local memory; and modifying an instruction in the instruction code that uses data to be loaded into a second region outside of the second contiguous block of the local memory using a second DMA load instruction of the second group of DMA load instructions, such that the modified instruction uses data loaded into the second contiguous block of the local memory.

* * * * *